US009812841B2

(12) United States Patent
Onose et al.

(10) Patent No.: US 9,812,841 B2
(45) Date of Patent: Nov. 7, 2017

(54) LASERSYSTEM

(71) Applicant: GIGAPHOTON INC., Tochigi (JP)

(72) Inventors: Takashi Onose, Tochigi (JP); Kouji Kakizaki, Tochigi (JP); Osamu Wakabayashi, Tochigi (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/227,028

(22) Filed: Aug. 3, 2016

(65) Prior Publication Data

US 2016/0344158 A1 Nov. 24, 2016

Related U.S. Application Data

(63) Continuation of application No. PCT/JP2014/057131, filed on Mar. 17, 2014.

(51) Int. Cl.
*H01S 3/23* (2006.01)
*H01S 3/225* (2006.01)
*H01S 3/30* (2006.01)
*H01S 3/00* (2006.01)
*H01S 3/10* (2006.01)
*H05G 2/00* (2006.01)
*H01S 3/13* (2006.01)

(52) U.S. Cl.
CPC .......... *H01S 3/2391* (2013.01); *H01S 3/0092* (2013.01); *H01S 3/10015* (2013.01); *H01S 3/2251* (2013.01); *H01S 3/30* (2013.01); *H01S 3/305* (2013.01); *H05G 2/00* (2013.01); *H01S 3/1301* (2013.01)

(58) Field of Classification Search
CPC .................................... H01S 3/30; H01S 3/305
See application file for complete search history.

(56) References Cited

U.S. PATENT DOCUMENTS

| 3,815,043 A  *  | 6/1974 | Carman, Jr. ........... H01S 3/305 359/334 |
| 5,771,117 A     | 6/1998 | Harris et al. |
| 2002/0001321 A1* | 1/2002 | Perry .................... B23K 26/12 372/22 |
| 2005/0271094 A1* | 12/2005 | Miller ...................... G02F 1/39 372/25 |
| 2010/0027000 A1* | 2/2010 | Pestov ..................... G01J 3/44 356/301 |

OTHER PUBLICATIONS

A.J. Merriam et al., "Efficient Gas-Phase VUV Frequency Up-Conversion," IEEE Journal of Selected Topics in Quantum Electronics, vol. 5, No. 6, Nov./Dec. 1999, pp. 1502-1509.

(Continued)

*Primary Examiner* — Michael Carter
(74) *Attorney, Agent, or Firm* — Studebaker & Brackett PC

(57) ABSTRACT

There is provided a laser system that may include a Raman cell, a pumping light generator, and a Raman cell laser unit. The pumping light generator may include one or more optical parametric amplifiers (OPAs), and may be configured to output first Raman-cell pumping light and second Raman-cell pumping light to the Raman cell. The Raman cell laser unit may be configured to output probing light as a target of wavelength conversion to the Raman cell.

15 Claims, 14 Drawing Sheets

(56) References Cited

OTHER PUBLICATIONS

V. Schulz-Von Der Gathen et al., "VUV Generation by High-Order CARS," IEEE Journal of Quantum Electronics, vol. 26, No. 4, Apr. 1990, pp. 739-743.

M. Lutgens et al., "Coherent anti-Stokes Raman scattering with broadband excitation and narrowband probe," Optics Express, vol. 20, No. 6, Mar. 12, 2012, pp. 6478-6487.

D.J. Jones et al., "Synchronization of two passively mode-locked, picosecond lasers within 20 fs for coherent anti-Stokes Raman scattering microscopy," Review of Scientific Instruments, vol. 73, No. 8, Aug. 2002, pp. 2843-2848.

A.J. Merriam et al., "Efficient gas-phase generation of coherent vacuum ultraviolet radiation," Optics Letters, vol. 24, No. 9, May 1, 1999, pp. 625-627.

International Search Report dated Jun. 17, 2014 from corresponding PCT/JP2014/057131, 2 pp.

\* cited by examiner

ArF EXCIMER LASER

| Order | Wavelength [nm] |
|---|---|
| 8 | 117.65 |
| 7 | 123.71 |
| 6 | 130.42 |
| 5 | 137.91 |
| 4 | 146.30 |
| 3 | 155.79 |
| 2 | 166.59 |
| 1 | 179.00 |
| 0 | 193.40 |
| -1 | 210.33 |
| -2 | 230.50 |
| -3 | 254.95 |
| -4 | 285.21 |
| -5 | 323.61 |
| -6 | 373.97 |
| -7 | 442.89 |
| -8 | 542.95 |
| -9 | 701.41 |
| -10 | 990.50 |
| -11 | 1684.95 |
| -12 | 5637.47 |

F2 LASER

| Order | Wavelength[nm] |
|---|---|
| 8 | 103.38 |
| 7 | 108.03 |
| 6 | 113.11 |
| 5 | 118.70 |
| 4 | 124.87 |
| 3 | 131.71 |
| 2 | 139.35 |
| 1 | 147.93 |
| 0 | 157.63 |
| -1 | 168.69 |
| -2 | 181.43 |
| -3 | 196.25 |
| -4 | 213.70 |
| -5 | 234.55 |
| -6 | 259.92 |
| -7 | 291.44 |
| -8 | 331.66 |
| -9 | 384.76 |
| -10 | 458.10 |
| -11 | 565.99 |
| -12 | 740.34 |

FIG. 5

KrF EXCIMER LASER

| Order | Wavelength[nm] |
|---|---|
| 9 | 128.71 |
| 8 | 135.99 |
| 7 | 144.15 |
| 6 | 153.35 |
| 5 | 163.80 |
| 4 | 175.78 |
| 3 | 189.65 |
| 2 | 205.90 |
| 1 | 225.20 |
| 0 | 248.48 |
| -1 | 277.13 |
| -2 | 313.26 |
| -3 | 360.21 |
| -4 | 423.72 |
| -5 | 514.42 |
| -6 | 654.52 |
| -7 | 899.49 |
| -8 | 1437.53 |
| -9 | 3577.38 |

FIG. 6

LASER SYSTEM

CROSS REFERENCE TO RELATED APPLICATIONS

This is a continuation of International Application No. PCT/JP2014/057131, filed Mar. 17, 2014, the entire contents of which are incorporated herein by reference.

BACKGROUND

The disclosure relates to a laser system using Raman scattering.

With miniaturization and high integration of a semiconductor integrated circuit, an improvement in resolution has been demanded for a semiconductor exposure apparatus. Hereinafter, the semiconductor exposure apparatus is simply referred to as an "exposure apparatus". Shortening in a wavelength of light to be outputted from an exposure light source has been in progress accordingly. A gas laser device is used in place of an existing mercury lamp for the exposure light source. Currently, a KrF excimer laser device and an ArF excimer laser device may be used as gas laser devices for exposure. The KrF excimer laser device may output ultraviolet light of a wavelength of 248 nm, and an ArF excimer laser device may output ultraviolet light of a wavelength of 193 nm.

As a next generation exposure technology, liquid immersion exposure has been studied in which a clearance between an exposure lens on exposure apparatus side and a wafer is filled with a liquid and a refractive index is changed to shorten an apparent wavelength of light derived from the exposure light source. When the liquid immersion exposure is performed using the ArF excimer laser device as the exposure light source, ultraviolet light of a wavelength of 134 nm in water may be applied to the wafer. This technology is referred to as ArF liquid immersion exposure. The ArF liquid immersion exposure may also be referred to as ArF liquid immersion lithography.

Since a spectral line width in free oscillation of each of the KrF excimer laser device and the ArF excimer laser device is wide, e.g., in a range from about 350 pm to about 400 pm, color aberration and its consequential decrease in resolution occur when projection lenses of the KrF excimer laser device and the ArF excimer laser device are used. It is therefore necessary to narrow a spectral line width of a laser beam to be outputted from the gas laser device to an extent in which the color aberration is negligible. The spectral line width is also referred to as a spectral width. Accordingly, a line narrowing module including a line narrowing device is provided in a laser resonator of the gas laser device to achieve narrowing of the spectral width. Non-limiting examples of the line narrowing device may include an etalon and a grating. The laser device that allows for narrowing of the spectral width is referred to as a line narrowing laser device.

Further, development of a unit that generates vacuum ultraviolet (VUV) light of a wavelength equal to or lower than an wavelength of an ArF excimer laser has been in progress. Since few laser media produce VUV light, wavelength conversion is necessary to produce VUV light. Typical wavelength conversion methods may include wavelength conversion using a nonlinear crystal and wavelength conversion using Raman scattering. For example, reference is made to U.S. Pat. No. 5,771,117 and Andrew J. Merriam, S. J. Sharpe, H. Xia, D. Manuszak, G. Y. Yin, and S. E. Harris, "Efficient gas-phase generation of coherent vacuum ultraviolet radiation", OPTICS LETTERS, Vol. 24, No. 9 (1999) 625-627.

SUMMARY

A laser system according to an embodiment of the disclosure may include a Raman cell, a pumping light generator, and a Raman cell laser unit. The pumping light generator may include one or more optical parametric amplifiers (OPAs), and may be configured to output first Raman-cell pumping light and second Raman-cell pumping light to the Raman cell. The Raman cell laser unit may be configured to output probing light as a target of wavelength conversion to the Raman cell.

BRIEF DESCRIPTION OF THE DRAWINGS

Some example embodiments of the disclosure are described below as mere examples with reference to the accompanying drawings.

FIG. 5 illustrates an example of wavelengths of wavelength conversion target light when an F2 laser is used, and Stokes light and anti-Stokes light generated from the wavelength conversion target light.

FIG. 6 illustrates an example of wavelengths of wavelength conversion target light when a KrF excimer laser is used, and Stokes light and anti-Stokes light generated from the wavelength conversion target light.

Figure 1:
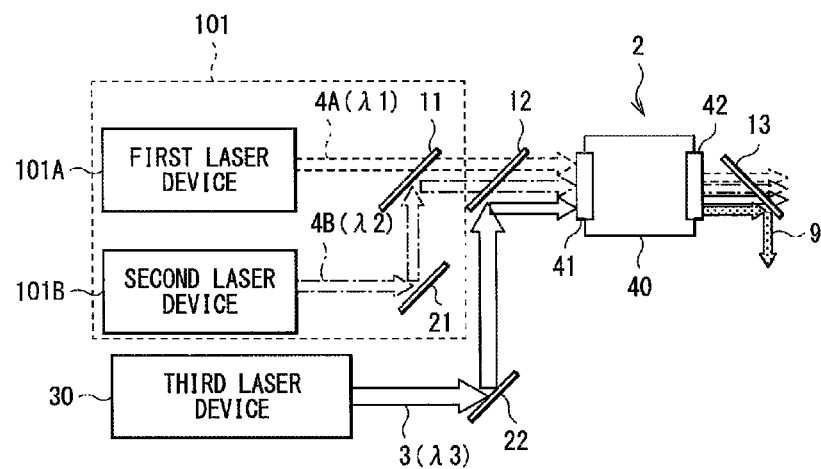
FIG. 1 schematically illustrates a configuration example of a VUV light generator.

DETAILED DESCRIPTION (Contents)
[1. Outline]
[2. Description of Terms]
[3. VUV Light Generator by High-coherent Raman] (FIG. 1)
   3.1 Configuration
   3.2 Operation
   3.3 Issues
[4. First Embodiment] (VUV light generator including pumping light generator with OPA) (FIG. 2, and FIGS. 3 to 6)
   4.1 Configuration (FIG. 2)
   4.2 Operation
   4.3 Workings
   4.4 Modification Examples
   4.5 Specific Examples of Wavelengths (FIGS. 3 to 6)
      4.5.1 Configurations of Specific Examples
      4.5.2 Operation and Workings of Specific Examples
      4.5.3 Modification Examples of Specific Examples
[5. Second Embodiment] (Control system of VUV light generator including pumping light generator) (FIGS. 7 to 9)
   5.1 Configuration
   5.2 Operation
   5.3 Workings
   5.4 Modification Examples
[6. Third Embodiment] (Variations of pumping light generator with OPA) (FIGS. 10 to 14)
   6.1 First Configuration Example (FIG. 10)
      6.1.1 Configuration
      6.1.2 Operation
      6.1.3 Workings
      6.1.4 Modification Examples
   6.2 Second Configuration Example (FIG. 11)
   6.3 Third Configuration Example (FIG. 12)
      6.3.1 Configuration
      6.3.2 Operation and Workings
   6.4 Fourth Configuration Example (FIG. 13)
      6.4.1 Configuration
      6.4.2 Operation
      6.4.3 Workings
      6.4.4 Modification Examples
   6.5 Fifth Configuration Example (FIG. 14)
      6.5.1 Configuration
      6.5.2 Operation and Workings
[7. Fourth Embodiment] (VUV light generator in which polarization directions are optimized) (FIGS. 15 and 16)
   7.1 First Configuration Example (FIG. 15)
   7.2 Second Configuration Example (FIG. 16)
[8. Fifth Embodiment] (Optimization of Raman-cell Pumping Light)
   8.1 Optimization of Wavelength of Raman-cell Pumping Light
   8.2 Optimization of Spectral Line Width of Raman-cell Pumping Light
[9. Hardware Environment of Control Section] (FIG. 17)
[10. Et Cetera]

In the following, some example embodiments of the disclosure are described in detail with reference to the drawings. Example embodiments described below each illustrate one example of the disclosure and are not intended to limit the contents of the disclosure. Further, all of the configurations and operations described in each example embodiment are not necessarily essential for the configurations and operations of the disclosure. Note that like components are denoted with like reference numerals, and redundant description thereof is omitted.

[1. Outline]

The disclosure relates to a laser system configured to generate VUV light of a wavelength equal to or lower than a wavelength of an ArF excimer laser, for example.

[2. Description of Terms]

Wavelengths of two excitation light beams may be adjusted to be in a range from resonance to near resonance, thereby causing a state in which molecules of a Raman medium move coherently. As a result, unlike general stimulated Raman scattering, Stokes light and anti-Stokes light may be generated on the same axis in defiance of phase matching. In the disclosure, this phenomenon is referred to as "high-coherent Raman".

[3. VUV light Generator By High-Coherence Raman]

3.1 Configuration

FIG. 1 schematically illustrates a configuration example of a VUV light generator by high-coherence Raman. The VUV light generator may include a pumping light generator 101, a third laser device 30, a high-reflective mirror 22, a dichroic mirror 12, a Raman cell 2, and a dichroic mirror 13.

The Raman cell 2 may include a chamber 40, a window 41, and a window 42. The window 41 may allow laser light to enter the Raman cell 2, and the window 42 may allow laser light to be outputted from the Raman cell 2. A gas contained in the Raman cell 2 may be a hydrogen gas, for example. Preferably, the gas contained in the Raman cell 2 may be a parahydrogen gas in which electrons spin in the same direction. The window 42 may be made of a crystal of a fluoride that allows VUV light 9 to pass therethrough. Non-limiting examples of the fluoride may include $CaF_2$ and $MgF_2$.

The pumping light generator 101 may include a first laser device 101A, a second laser device 101B, a high-reflective mirror 21, and a dichroic mirror 11.

The first laser device 101A may be a narrow-band laser device that outputs a pulsed laser light beam of a wavelength $\lambda 1$ corresponding to first Raman-cell pumping light 4A. The first laser device 101A may be, for example, a laser device including a laser diode and an amplifier. The laser diode may oscillate in a single longitudinal mode. The amplifier may amplify seed light. In this case, the amplifier may include a titanium sapphire crystal, for example.

The second laser device 101B may be a narrow-band laser device that outputs a pulsed laser light beam of a wavelength $\lambda 2$ corresponding to second Raman-cell pumping light 4B. The second laser device 101B may be, for example, a laser device including a laser diode and an amplifier. The laser diode may oscillate in the single longitudinal mode. The amplifier may amplify seed light. In this case, the amplifier may include a titanium sapphire crystal, for example.

At this occasion, the wavelength $\lambda 1$ and the wavelength $\lambda 2$ may be adjusted so that a difference between light energy of the first Raman-cell pumping light 4A and light energy of the second Raman-cell pumping light 4B causes one of resonance and near resonance of a gas molecule contained in the Raman cell 2.

The high-reflective mirror 21 and the dichroic mirror 11 may be so disposed as to allow the first Raman-cell pumping light 4A and the second Raman-cell pumping light 4B to be outputted along substantially the same axis from the pumping light generator 101. The high-reflective mirror 21 may be coated with a film that reflects light of the wavelength $\lambda 2$ at high reflectivity. The dichroic mirror 11 may be coated with a film that allows the light of the wavelength λ1 to pass therethrough at high transmittance and reflects the light of the wavelength λ2 at high reflectivity.

The third laser device 30 may be a laser device that outputs a pulsed laser light beam corresponding to wavelength conversion target light 3. The wavelength conversion target light 3 may be probing light as a target of wavelength conversion. The wavelength conversion target light 3 may be ultraviolet light of a wavelength λ3. The third laser device 30 may be one of a KrF excimer laser, an ArF excimer laser, and an F2 laser, for example. The third laser device 30 may be a solid-state laser device including a nonlinear crystal. The solid-state laser device may output ultraviolet laser light.

The high-reflective mirror 22 and the dichroic mirror 12 may be so disposed as to allow the first Raman-cell pumping light 4A, the second Raman-cell pumping light 4B, and the wavelength conversion target light 3 to enter the window 41 of the Raman cell 2 along substantially the same axis.

The high-reflective mirror 22 may be coated with a film that reflects the light of the wavelength λ3 at high reflectivity. The dichroic mirror 12 may be coated with a film that allows the light of the wavelength λ1 and the light of the wavelength λ2 to pass therethrough at high transmittance and reflects the light of the wavelength λ3 at high reflectivity.

The dichroic mirror 13 may be disposed in a light path of laser light outputted from the window 42 of the Raman cell 2. The dichroic mirror 13 may be coated with a film that reflects light of a wavelength equal to a wavelength of the desired VUV light 9 generated by the Raman cell 2 at high reflectivity and allows the light of the wavelength λ1, the light of the wavelength λ2, and the light of the wavelength λ3 to pass therethrough at high transmittance.

3.2 Operation

In the VUV light generator illustrated in FIG. 1, the first laser device 101A and the second laser device 101B may respectively output the pulsed laser light beam of the wavelength λ1 and the pulsed laser light beam of the wavelength λ2. The pulsed laser light beam of the wavelength λ1 corresponding to the first Raman-cell pumping light 4A may pass through the dichroic mirror 11 and the dichroic mirror 12 at high transmittance to enter the Raman cell 2. The pulsed laser light beam of the wavelength λ2 corresponding to the second Raman-cell pumping light 4B may be reflected by the high-reflective mirror 21 and the dichroic mirror 11 at high reflectivity to be aligned along substantially the same axis as axis of the pulsed laser light beam of the wavelength λ1. Thereafter, the pulsed laser light beam of the wavelength λ2 may pass through the dichroic mirror 12 to enter the Raman cell 2.

The pulsed laser light beam of the wavelength λ3 corresponding to the wavelength conversion target light 3 may be reflected by the high-reflective mirror 22 and the dichroic mirror 12 at high reflectivity to be aligned along substantially the same axis as the axes of the pulsed laser light beam of the wavelength λ1 and the pulsed laser light beam of the wavelength λ2. Thereafter, the pulsed laser light beam of the wavelength λ3 may enter the Raman cell 2.

The high-coherence Raman phenomenon may occur when the pulsed laser light beams of the wavelength λ1, the wavelength λ2, and the wavelength λ3 pass through the gas contained in the Raman cell 2 along substantially the same axis. As a result, Stokes light and anti-Stokes light may be generated from the wavelength conversion target light 3 of the wavelength λ3 in the Raman cell 2. The generated anti-Stokes light may be pulsed laser light beam of a plurality of orders in a VUV wavelength range that is shorter than the wavelength λ3 of the wavelength conversion target light 3.

The pulsed laser light beams of the wavelength λ1, the wavelength λ2, and the wavelength λ3, and a plurality of Stokes light beams, and a plurality of anti-stokes light beams may be outputted from the window 42. The desired VUV light 9 out of these pulsed laser light beams may be reflected by the dichroic mirror 13 at high reflectivity, and the other pulsed laser light beams including, but not limited to, the pulsed laser light beams of the wavelength λ1, the wavelength λ2 and the wavelength λ3 and the Stokes light may pass through the dichroic mirror 13 at high transmittance.

3.3 Issues

In order to output two Raman-cell pumping light beams, the VUV light generator illustrated in FIG. 1 may use two independent narrow-band high-power pulsed laser devices, i.e., the first laser device 101A and the second laser device 101B. It may be therefore difficult to keep overlapping of rising times of laser pulses corresponding to the two Raman-cell pumping light beams for a long time.

Moreover, the following issues arise when the first laser device 101A and the second laser device 101B each use a titanium sapphire laser for wavelength tuning. First, laser light of a wavelength around 500 nm may be separately necessary to excite a crystal, which may cause deterioration in oscillation efficiency and a significant increase in system size. Moreover, the titanium sapphire crystal is strongly affected by a thermal lens effect. Accordingly, when the titanium sapphire laser has higher repetition and higher power, wavefront distortion may occur. It may be therefore difficult to achieve a stable high-coherence Raman phenomenon.

[4. First Embodiment](VUV Light Generator Including Pumping Light Generator with OPA)

4.1 Configuration

Figure 2:
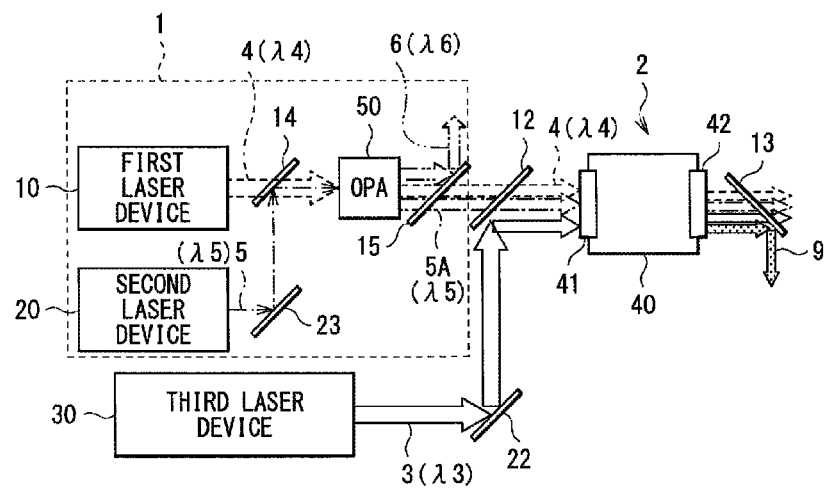
FIG. 2 schematically illustrates a configuration example of a VUV light generator as a laser system that includes a pumping light generator.

FIG. 2 schematically illustrates a configuration example of a VUV light generator as a laser system that includes a pumping light generator 1 according to a first embodiment of the disclosure. It is to be noted that substantially the same components as those in the VUV light generator illustrated in FIG. 1 are denoted with the same reference numerals, and redundant description thereof is omitted.

The VUV light generator illustrated in FIG. 2 may include the pumping light generator 1 in place of the pumping light generator 101 in FIG. 1. The pumping light generator 1 may include a first laser device 10 and a second laser device 20. The pumping light generator 1 may further include a high-reflective mirror 23, a dichroic mirror 14, an optical parametric amplifier (OPA) 50, and a dichroic mirror 15.

The first laser device 10 may correspond to a first OPA laser device. The second laser device 20 may correspond to a second OPA laser device. The third laser device 30 may correspond to a Raman cell laser unit that outputs the wavelength conversion target light 3 corresponding to probing light. The pumping light generator 1 may output at least the first Raman-cell pumping light and the second Raman-cell pumping light to the Raman cell 2. The OPA 50 may receive OPA pumping light 4 and OPA signal light 5. The OPA 50 may output, to the Raman cell 2, two light beams out of three light beams. The three light beams may correspond to the OPA pumping light 4, amplified light 5A of the OPA signal light 5, and idler light 6. The two light beams may correspond to the first Raman-cell pumping light and the second Raman-cell pumping light.

The first laser device 10 may be a narrow-band laser device that outputs a pulsed laser light beam of a wavelength λ4 corresponding to the OPA pumping light 4. The first laser device 10 may be, for example, a laser device that includes a laser diode, a light shutter, an amplifier, and a lithium triborate (LBO) crystal. The laser diode may oscillate in a continuous wave (CW) single longitudinal mode. The amplifier may amplify seed light. The LBO crystal may produce a second harmonic. In this case, the light shutter may include a combination of an Electro-Optical (EO) Pockels cell and a polarizer, for example. The amplifier may include an ytterbium (Yb) fiber amplifier, for example.

The second laser device 20 may be a narrow-band laser device that outputs a pulsed laser light beam of a wavelength λ5 corresponding to the OPA signal light 5. The second laser device 20 may include a combination of a laser diode, a light shutter, and an amplifier, for example. The laser diode may oscillate in the CW single longitudinal mode. In this case, the light shutter may include a combination of an EO Pockels cell and a polarizer, for example.

The high-reflective mirror 23 and the dichroic mirror 14 may be so disposed as to align the pulsed laser light beam of the wavelength λ4 and the pulsed laser light beam of the wavelength λ5 along substantially the same axis. The high-reflective mirror 23 may be coated with a film that reflects light of the wavelength λ5 at high reflectivity. The dichroic mirror 14 may be coated with a film that allows light of the wavelength λ4 to pass therethrough at high transmittance and reflects the light of the wavelength λ5 at high reflectivity.

The OPA 50 may be so disposed as to receive the pulsed laser light beam of the wavelength λ4 corresponding to the OPA pumping light 4 and the pulsed laser light beam of the wavelength λ5 corresponding to the OPA signal light 5. The OPA 50 may be periodically poled lithium niobate (PPLN) or a beta-barium borate (BBO) crystal, for example.

The dichroic mirror 15 may be disposed in a light path on output side of the OPA 50. The dichroic mirror 15 may be coated with a film that allows the light of the wavelength λ4 and the light of the wavelength λ5 to pass therethrough at high transmittance and reflects light of a wavelength λ6 at high reflectivity. The wavelength λ6 may be equal to a wavelength of the idler light 6 generated by the OPA 50.

4.2 Operation

In the VUV light generator illustrated in FIG. 2, the first laser device 10 may output the pulsed laser light beam corresponding to the OPA pumping light 4 of the wavelength λ4. Moreover, the second laser device 20 may output the pulsed laser light beam corresponding to the OPA signal light 5 of the wavelength λ5. The OPA pumping light 4 of the wavelength λ4 may pass through the dichroic mirror 14 at high transmittance to enter the OPA 50. The OPA signal light 5 of the wavelength λ5 may be reflected by the high-reflective mirror 23 and the dichroic mirror 14 at high reflectivity to be aligned along substantially the same axis as an axis of the OPA pumping light 4 of the wavelength λ4. Thus, the OPA signal light 5 of the wavelength λ5 may enter the OPA 50 together with the OPA pumping light 4 of the wavelength λ4.

When the OPA pumping light 4 of the wavelength λ4 and the OPA signal light 5 of the wavelength λ5 pass through the crystal of the OPA 50, the OPA signal light 5 of the wavelength λ5 may be amplified to generate the idler light 6 of the wavelength λ6. Further, the OPA 50 may output three light beams corresponding to the OAP pumping light 4 of the wavelength λ4, amplified light 5A of the OPA signal light 5 of the wavelength λ5, and the idler light 6 of the wavelength λ6. Here, the following relational expression (1) may be established relating to the wavelength λ6 of the idler light 6:

$$c/\lambda 4 - c/\lambda 5 = c/\lambda 6 \quad (1)$$

where c denotes light speed.

The idler light 6 out of the above-described three light beams may be reflected by the dichroic mirror 15 at high reflectivity, and the OPA pumping light 4 and the amplified light 5A of the OPA signal light 5 may pass through the dichroic mirror 15 at high transmittance. Further, the OPA pumping light 4 of the wavelength λ4 and the amplified light 5A of the OPA signal light 5 of the wavelength λ5 may pass through the dichroic mirror 12 at high transmittance to enter the Raman cell 2. The OPA pumping light 4 of the wavelength λ4 and the amplified light 5A of the OPA signal light 5 of the wavelength λ5 may respectively correspond to the first Raman-cell pumping light and the second Raman-cell pumping light.

At this occasion, wavelength control may be performed on each of oscillation wavelengths of the first laser device 10 and the second laser device 20 to allow a difference between light energy of the wavelength λ4 and light energy of the wavelength λ5 to cause one of resonance and near resonance of the gas molecule contained in the Raman cell 2.

The pulsed laser light beam of the wavelength λ3 corresponding to the wavelength conversion target light 3 (i.e., probing light) may be reflected by the high-reflective mirror 22 and the dichroic mirror 12 at high reflectivity to be aligned along substantially the same axis as axes of the pulsed laser light beams of the wavelength λ4 and the wavelength λ5. Thereafter, the wavelength conversion target light 3 may enter the Raman cell 2.

The high-coherence Raman phenomenon may occur when the pulsed laser light beams of the wavelength λ4, the wavelength λ5, and the wavelength λ3 pass through the gas contained in the Raman cell 2 along substantially the same axis. As a result, the Raman cell 2 may generate Stokes light and anti-Stokes light from the wavelength conversion target light 3 of the wavelength λ3. The generated anti-Stokes light may be pulsed laser light beams of a plurality of orders of a wavelength that is shorter than the wavelength λ3 of the wavelength conversion target light 3.

The pulsed laser light beams of the wavelength λ4, the wavelength λ5, and the wavelength λ3, and a plurality of Stokes light beams, and a plurality of anti-stokes light beams may be outputted from the window 42. The desired VUV light 9 out of these light beams may be reflected by the dichroic mirror 13 at high reflectivity, and the other light beams including, but not limited to, the pulsed laser light beams of the wavelength λ4, the wavelength λ5, and the wavelength λ3 and the Stokes light may pass through the dichroic mirror 13 at high transmittance.

4.3 Workings

According to the first embodiment, with use of the OPA 50, the low-power OPA signal light 5 may be amplified by the high-power OPA pumping light 4 to be converted into the idler light 6. The OPA pumping light 4 and the amplified light 5A of the OPA signal light 5 that have passed through the OPA 50 each may be used as Raman-cell pumping light, which may make it possible to downsize the pumping light generator 1, as compared with the VUV light generator illustrated in FIG. 1.

The first laser device 10 and the second laser device 20 each may include a combination of a laser diode, a light shutter, and an amplifier. The laser diode may oscillate in the CW single longitudinal mode. In this case, control of timings of opening and closing of the light shutter in each of the first laser device 10 and the second laser device 20 may make it possible to stabilize an output timing and a pulse waveform of the pulsed laser light beam outputted from each of the first laser device 10 and the second laser device 20.

4.4 Modification Examples

The above description involves an example in which the OPA pumping light 4 and the amplified light 5A of the OPA signal light 5 each are used as the Raman-cell pumping light; however, the Raman-cell pumping light is not limited thereto, and one of the following combinations (a) and (b) may be used as the Raman-cell pumping light.

(a) the OPA Pumping Light 4 of the Wavelength $\lambda 4$ and the Idler Light 6 of the Wavelength $\lambda 6$ In a case with the combination (a), the dichroic mirror 15 may be coated with a film that reflects the light of the wavelength $\lambda 5$ at high reflectivity and allows light of the wavelength $\lambda 4$ and the light of the wavelength $\lambda 6$ to pass therethrough at high transmittance.

(b) Amplified Light 5A of the OPA Signal Light 5 of the Wavelength $\lambda 5$ and the Idler Light 6 of the Wavelength $\lambda 6$ In a case with the combination (b), the dichroic mirror 15 may be coated with a film that reflects the light of the wavelength $\lambda 4$ at high reflectivity and allows the light of the wavelength $\lambda 5$ and the light of the wavelength $\lambda 6$ to pass therethrough at high transmittance.

The laser diode that oscillates in the single longitudinal mode is described above as an example of the first laser device 10 and the second laser device 20. The first laser device 10 and the second laser device 20 are not limited thereto. For example, pulsed laser light beams to be outputted from the first laser device 10 and the second laser device 20 may be in a multiple longitudinal mode, but a spectral line width of each of the pulsed laser light beams in this mode may be a line width that may cause the high-coherence Raman phenomenon.

4.5 Specific Examples of Wavelengths 4.5.1 Configurations of Specific Examples

Figures 3, 4:
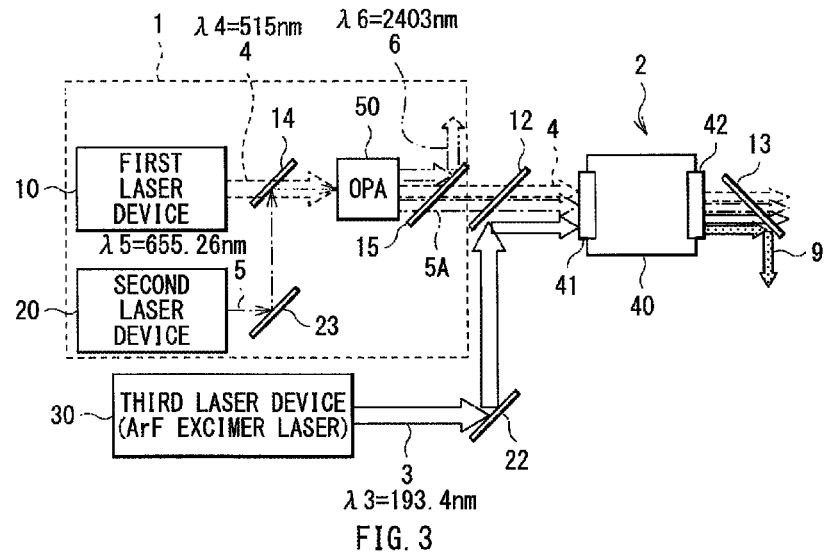
FIG. 3 illustrates a specific example of a laser wavelength used in the VUV light generator illustrated in FIG. 2.
FIG. 4 illustrates an example of wavelengths of wavelength conversion target light when an ArF excimer laser is used, and Stokes light and anti-Stokes light generated from the wavelength conversion target light.

FIG. 3 illustrates a specific example of a laser wavelength applied to the VUV light generator illustrated in FIG. 2. FIGS. 4 to 6 illustrate examples of wavelengths of the wavelength conversion target light 3, and the Stokes light and the anti-Stokes light generated from the wavelength conversion target light 3.

The first laser device 10 may include, for example, a laser diode, a light shutter, an amplifier, and a nonlinear crystal. The laser diode may oscillate in a CW mode at a wavelength of 1030 nm. The nonlinear crystal may generate a second harmonic. Further, the first laser device 10 may be, for example, a laser device that outputs a pulsed laser light beam of the wavelength $\lambda 4=515$ nm, as illustrated in FIG. 3.

The second laser device 20 may include, for example, a laser diode, a light shutter, and an amplifier. The laser diode may oscillate in the CW mode at a wavelength of 655.26 nm. Further, the second laser device 20 may be, for example, a laser device that outputs a pulsed laser light beam of the wavelength $\lambda 5=655.26$ nm, as illustrated in FIG. 3.

The third laser device 30 may include, for example, an ArF excimer laser device that oscillates at the wavelength $\lambda 3=193.4$ nm, as illustrated in FIG. 3.

4.5.2 Operation and Workings of Specific Examples

FIG. 4 illustrates wavelengths of Stokes light and anti-Stokes light that may be generated by the high-coherence Raman phenomenon in a case in which the third laser device 30 is an ArF excimer laser. In the case with the ArF excimer laser, anti-Stokes light beams of 179.0 nm, 166.59 nm, 155.79 nm, 146.30 nm, . . . may be respectively generated as +first-order, +second-order, +third-order, +fourth-order, . . . light beams. In this case, light intensity of +first-order, +second-order, +third-order, +fourth-order, . . . of anti-Stokes light beams may be respectively 15%, 6%, 3%, 1%, . . . with respect to light intensity at the wavelength $\lambda 3=193.4$ nm.

FIG. 5 illustrates wavelengths of Stokes light and anti-Stokes light that may be generated in a case where the third laser device 30 is an F2 laser. In the case with the F2 laser, anti-Stokes light beams of 147.93 nm, 139.35 nm, 131.71 nm, 124.87 nm, . . . may be respectively generated as +first-order, +second-order, +third-order, +fourth-order, . . . light beams, as illustrated in FIG. 5. In this case, +first-order, +second-order, +third-order, +fourth-order, . . . of anti-Stokes light beams may be respectively 15%, 6%, 3%, 1%, . . . with respect to light intensity of the wavelength $\lambda 3=157.63$ nm. Accordingly, the VUV light 9 of 124.87 nm may be generated.

FIG. 6 illustrates wavelengths of Stokes light and anti-Stokes light that may be generated in a case in which the third laser device 30 is a KrF excimer laser. In the case with the KrF excimer laser, anti-Stokes light beams of 225.20 nm, 205.90 nm, 189.65 nm, 175.78 nm, . . . may be respectively generated as +first-order, +second-order, +third-order, +fourth-order, . . . light beams, as illustrated in FIG. 6.

4.5.3 Modification Examples of Specific Examples

The third laser device 30 is not limited to the specific examples described above, and an argon dimer (Ar2) laser may be used as the third laser device 30. The Ar2 laser may oscillate at a wavelength of 126 nm.

Moreover, in order to generate Stokes light of a plurality of orders, in a case in which it is difficult to split the desired VUV light 9 by the dichroic mirror 13, light may be split by a prism of a calcium fluoride crystal or a reflective grating to extract the desired VUV light 9.

5. [Second Embodiment](Control system of VUV light generator including pumping light generator)

5.1 Configuration

Figure 7:
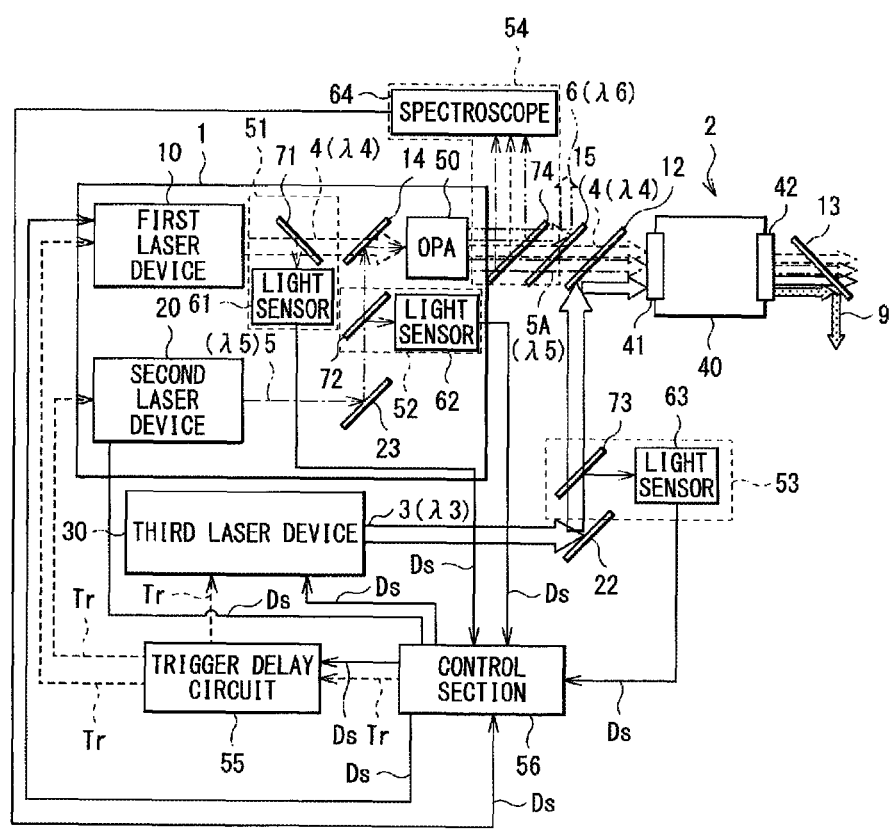
FIG. 7 schematically illustrates a configuration example of a control system of the VUV light generator that includes the pumping light generator.

FIG. 7 schematically illustrates a configuration example of a control system of a VUV light generator according to a second embodiment of the disclosure. It is to be noted that substantially the same components as those in the VUV light generator illustrated in FIG. 2 are denoted with the same reference numerals, and redundant description thereof is omitted.

The VUV light generator illustrated in FIG. 7 may correspond to the VUV light generator illustrated in FIG. 2 that further includes a first monitor section 51, a second monitor section 52, a third monitor section 53, a fourth monitor section 54, a control section 56, and a trigger delay circuit 55. In FIG. 7, Tr denotes a trigger signal line, and Ds denotes a transmission-reception line of a control signal or a data signal.

The first monitor section 51 may correspond to a pumping light monitor that measures a state of the OPA pumping light 4. The second monitor section 52 may correspond to a signal-light monitor that measures a state of the OPA signal light 5. The third monitor section 53 may correspond to a probing light monitor that measures a state of the wavelength conversion target light 3. The fourth monitor section 54 may be disposed in a light path between the OPA 50 and the Raman cell 2, and may correspond to an OPA monitor that measures states of three light beams corresponding to the OPA pumping light 4, the amplified light 5A of the OPA signal light 5, and the idler light 6.

The first monitor section 51 may be disposed in a light path between the first laser device 10 and the dichroic mirror 14. The second monitor section 52 may be disposed in a light path between the high-reflective mirror 23 and the dichroic mirror 14. The third monitor section 53 may be disposed in a light path between the high-reflective mirror 22 and the dichroic mirror 12. The fourth monitor section 54 may be disposed in a light path between the OPA 50 and the dichroic mirror 15.

The first monitor section 51 may include a beam splitter 71 and a first light sensor 61. The beam splitter 71 may be disposed in a light path between the first laser device 10 and the dichroic mirror 14. The beam splitter 71 may be coated with a film that reflects a part of the OPA pumping light 4 of the wavelength $\lambda 4$.

The second monitor section 52 may include a beam splitter 72 and a second light sensor 62. The beam splitter 72 may be disposed in a light path between the high-reflective mirror 23 and the dichroic mirror 14. The beam splitter 72 may be coated with a film that reflects a part of the OPA signal light 5 of the wavelength $\lambda 5$.

The third monitor section 53 may include a beam splitter 73 and a third light sensor 63. The beam splitter 73 may be coated with a film that reflects a part of the wavelength conversion target light 3 of the wavelength $\lambda 3$. The beam splitter 73 may be so disposed as to allow the part of the wavelength conversion target light 3 to enter the third light sensor 63.

The fourth monitor section 54 may include a beam splitter 74 and a spectroscope 64. The spectroscope 64 may be so disposed as to receive reflected light of the beam splitter 74. The beam splitter 74 may be coated with a film that reflects a part of the OPA pumping light 4 of the wavelength $\lambda 4$, a part of the amplified light 5A of the OPA signal light 5 of the wavelength $\lambda 5$, and a part of the idler light 6 of the wavelength $\lambda 6$. The spectroscope 64 may be, for example, a spectroscope including a Michelson interferometer, a grating, an etalon, or any other device. The spectroscope 64 may be a device that allows for measurement of the wavelength of each of the OPA pumping light 4, the amplified light 5A of the OPA signal light 5, and the idler light 6.

The first monitor section 51 and the second monitor section 52 may be so disposed as to allow a light path length L1 between the first light sensor 61 of the first monitor section 51 and the OPA 50 and a light path length L2 between the second light sensor 62 of the second monitor section 52 and the OPA 50 to be substantially equal to each other. The third monitor section 53 and one of the first monitor section 51 and the second monitor section 52 may be so disposed as to allow a light path length L3 between the third monitor section 53 and the Raman cell 2 and a light path length L4 between one of the first monitor section 51 and the second monitor section 52 and the Raman cell 2 to be substantially equal to each other.

The first, second, and third light sensors 61, 62, and 63 each may be a light sensor including one of a high-speed photodiode and a high-speed phototube that allows for measurement of a time waveform of pulsed laser light.

The control section 56 and the trigger delay circuit 55 may correspond to a first timing controller that controls the first laser device 10 and the second laser device 20. The first timing controller may perform timing control so as to allow both the OPA pumping light 4 and the OPA signal light 5 to be inputted to the OPA 50 substantially simultaneously, based on measurement results by the first monitor section 51 and the second monitor section 52.

The control section 56 and the trigger delay circuit 55 may correspond to a second timing controller that controls the second laser device 20 and the third laser device 30. The second timing controller may perform timing control so as to allow both the amplified light 5A of the OPA signal light 5 and the wavelength conversion target light 3 to be inputted to the Raman cell 2 substantially simultaneously, based on measurement results by the second monitor section 52 and the third monitor section 53.

The control section 56 may also correspond to a wavelength controller that controls one or both of the first laser device 10 and the second laser device 20. The wavelength controller may perform wavelength control so as to allow wavelengths of two laser light beams out of the OPA pumping light 4, the amplified light 5A of the OPA signal light 5, and the idler light 6 to be a desired wavelength, based on a measurement result by the fourth monitor section 54. The two laser light beams may correspond to the first Raman-cell pumping light and the second Raman-cell pumping light.

5.2 Operation

In the VUV light generator illustrated in FIG. 7, the control section 56 may measure, by the first and second monitor sections 51 and 52, time pulse waveforms of two pulsed laser light beams that are to enter the OPA 50 and a difference $\Delta T_{4-5}$ between timings of pulses of the two pulsed laser light beams. The two pulsed laser light beams may correspond to the OPA pumping light 4 and the OPA signal light 5. At this occasion, the control section 56 may transmit delay data to the trigger delay circuit 55 so as to allow the difference $\Delta T_{4-5}$ to be close to 0.

When $|\Delta T_{4-5}| \leq \Delta T_{4-5}\text{max}$ (equal or lower than an allowable value) is established, the OPA 50 may output the OPA pumping light 4 of the wavelength $\lambda 4$, the amplified light 5A of the OPA signal light 5 of the wavelength $\lambda 5$, and the idler light 6 of the wavelength $\lambda 6$.

The control section 56 may measure time pulse waveforms of two pulsed laser light beams corresponding to the OPA signal light 5 and the wavelength conversion target light 3 upon passing of the two pulsed laser light beams by the second monitor section 52 and the third monitor section 53. Since the second monitor section 52 and the third monitor section 53 are so disposed as to allow the light path length L3 between the third monitor section 53 and the Raman cell 2 and the light path length L4 between the second monitor section 52 and the Raman cell 2 to be equal to each other (L3=L4), the control section 56 may measure a difference $\Delta T_{3-5}$ between timings of pulse waveforms of the pulsed laser light beams when the pulsed laser light beams enter the Raman cell 2. At this occasion, the control section 56 may transmit delay data so as to allow the difference $\Delta T_{3-5}$ to be close to 0.

When $|\Delta T_{3-5}| \leq \Delta T_{3-5}\text{max}$ (equal to or lower than an allowable value) is established, the OPA pumping light 4, the amplified light 5A of the OPA signal light 5, and the wavelength conversion target light 3 may enter the Raman cell 2 substantially simultaneously.

The control section 56 may receive wavelength data of each of the OPA pumping light 4, the amplified light 5A of the OPA signal light 5, and the idler light 6. The wavelength data may be measured by the fourth monitor section 54. At this occasion, in order to cause the high-coherence Raman phenomenon, it may be necessary to satisfy the following expression:

$$h \cdot c / \lambda 4 - h \cdot c / \lambda 5 = \Delta E \qquad (2)$$

where h denotes Planck's constant, c denotes light speed, and $\Delta E$ denotes a band gap of Raman resonance or near resonance.

A target wavelength λ5t of the second laser device 20 may be determined by the following expression from the expression (2):

$$\lambda 5t = \lambda 4 \cdot h \cdot c / (h \cdot c - \lambda 4 \cdot \Delta E) \quad (3)$$

The control section 56 may calculate a difference δλ5 between the measured wavelength λ5 and the target wavelength λ5t of the OPA signal light 5, and may transmit a control signal to the second laser device 20 so as to allow the difference δλ5 to be close to 0. Thus, the control section 56 may control an oscillation wavelength.

Accordingly, |δλ5|≤δλ5max (equal to or lower than an allowable range) may be established. As a result, when the pulsed laser light beams of the wavelength λ4, the wavelength λ5, and the wavelength λ3 pass through the gas contained in the Raman cell 2 along substantially the same axis, the high-coherence Raman phenomenon may occur. As a result, the pulsed laser light beams of the wavelength λ5, the wavelength λ6, and the wavelength λ3, a plurality of Stokes light beams, and a plurality of anti-Stokes light beams may be outputted from the window 42 of the Raman cell 2. The desired VUV light 9 out of these light beams may be reflected by the dichroic mirror 13 at high reflectivity, and other light beams including, but not limited to, the pulsed laser light beams of the wavelength λ5, the wavelength λ6, and the wavelength λ3, and the Stokes light beams may pass through the dichroic mirror 13 at high transmittance.

Figure 8:
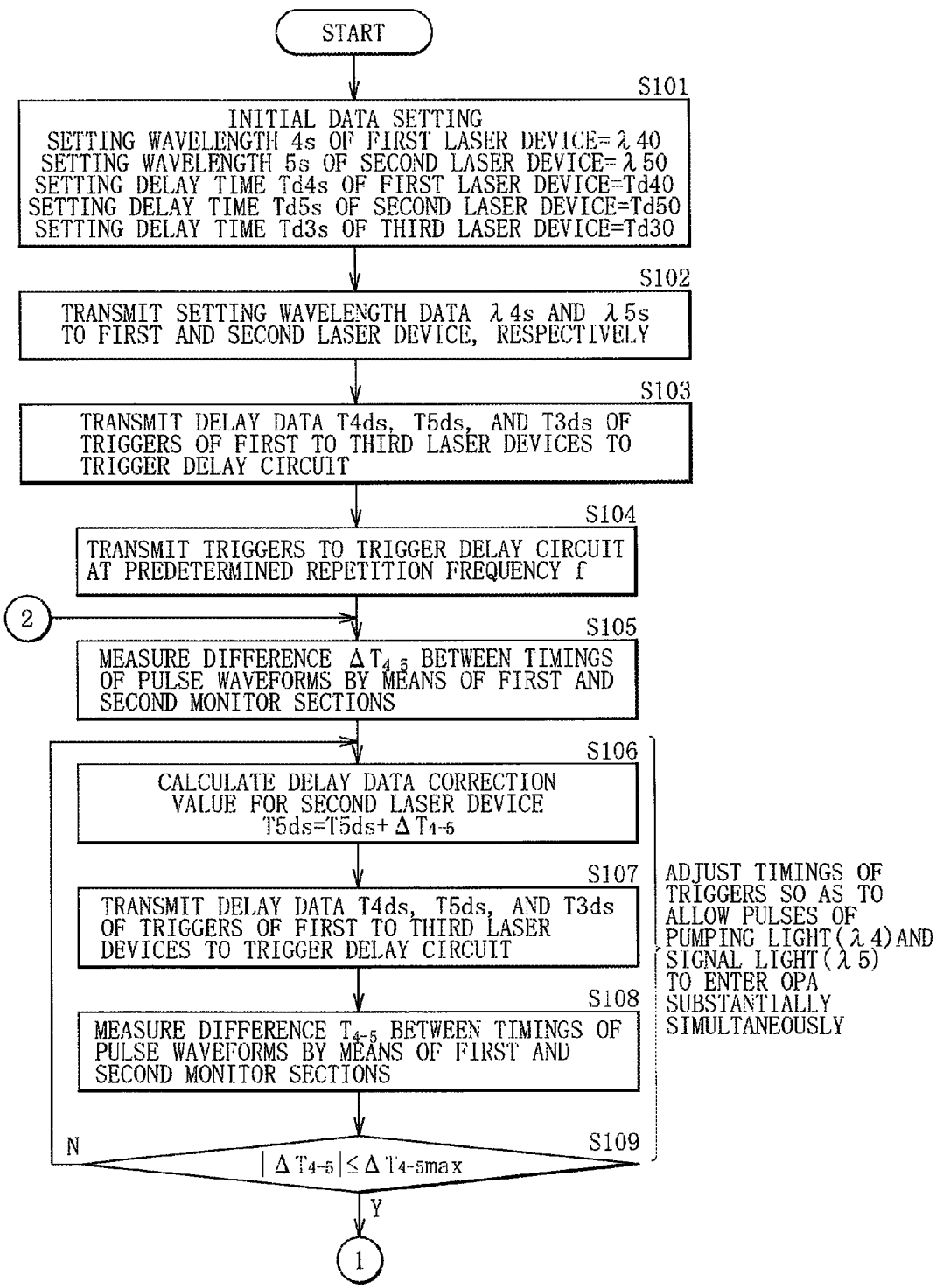
FIG. 8 illustrates an example of a flow of control of the VUV light generator.
Figure 9:
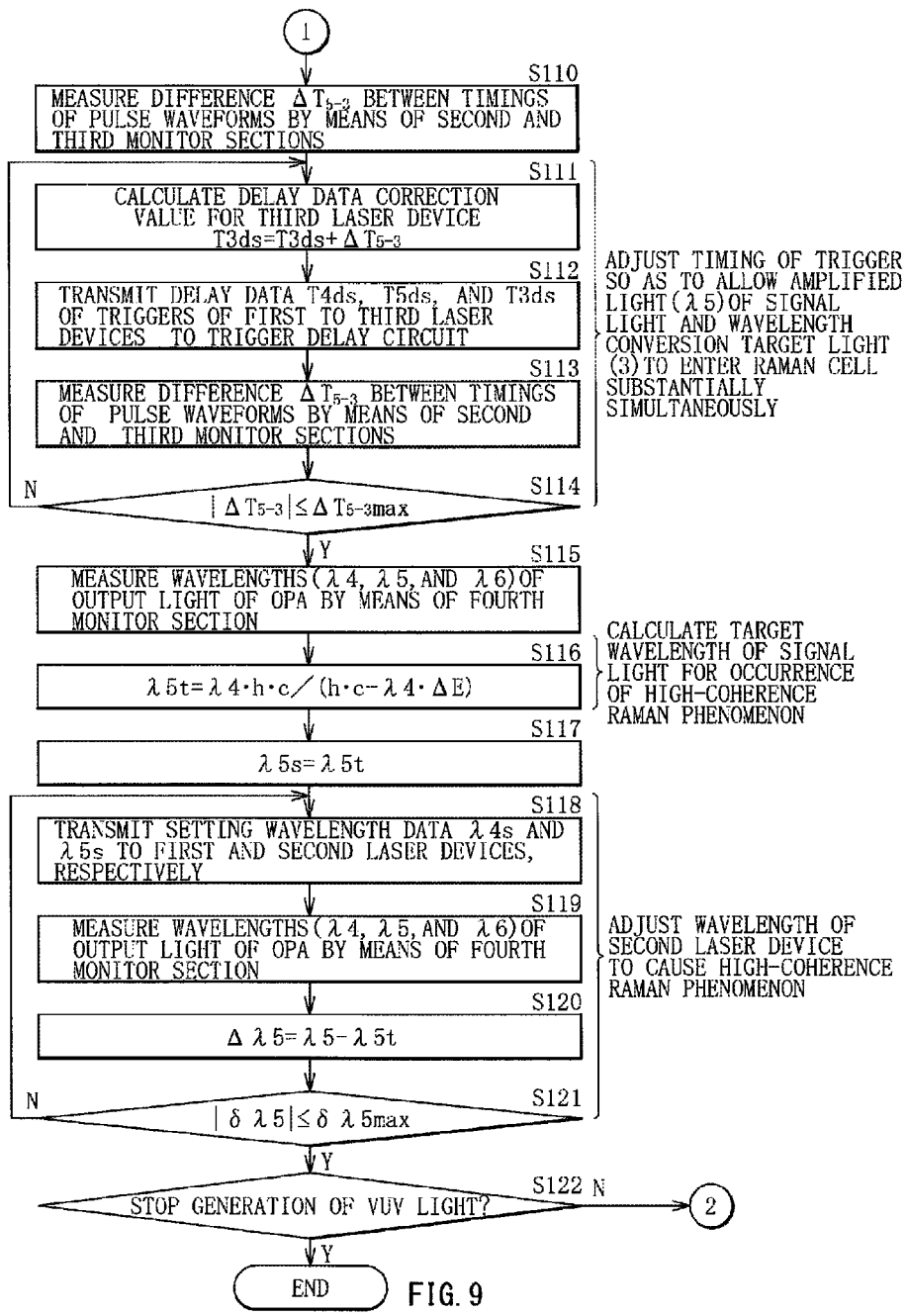
FIG. 9 illustrates an example of a flow of the control following FIG. 8.

In the following, more specific description is given of a flow of the above-described control with reference to FIGS. 8 and 9. FIG. 9 illustrates an example of the flow of the control following FIG. 8.

The control section 56 may start the following initial data setting process (step S101).

Setting wavelength λ4s of the first laser device 10=λ40
Setting wavelength λ5s of the second laser device 20=λ50
Setting delay time Td4s of the first laser device 10=Td40
Setting delay time Td5s of the second laser device 20=Td50
Setting delay time Td3s of the third laser device 30=Td30

The control section 56 may first transmit setting wavelength data λ4s and setting wavelength data λ5s to the first laser device 10 and the second laser device 20, respectively (step S102). Thereafter, the control section 56 may transmit delay data T4ds of a trigger of the first laser device 10, delay data T5ds of a trigger of the second laser device 20, and delay data T3ds of a trigger of the third laser device 30 to the trigger delay circuit 55 (step S103). At this time, the control section 56 may transmit the triggers to the trigger delay circuit 55 at a predetermined repetition frequency f (step S104).

The control section 56 may measure the difference $\Delta T_{4-5}$ between timings of the pulse waveforms of two pulsed laser light beams corresponding to the OPA pumping light 4 and the OPA signal light 5 by means of the first and second monitor sections 52 and 53 (step S105).

Next, the control section 56 may adjust timings of the triggers by the processes in the steps S106 to S109 so as to allow both the pulses of the OPA pumping light 4 and the OPA signal light 5 to enter the OPA 50 substantially simultaneously. For this adjustment, the control section 56 may first calculate the following delay data correction value for the second laser device 20 (step S106).

$$T5ds = T5ds + \Delta T_{4-5}$$

Next, the control section 56 may transmit, to the trigger delay circuit 55, the delay data T4ds of the trigger of the first laser device 10, the delay data T5ds of the trigger of the second laser device 20, and the delay data T3ds of the trigger of the third laser device 30 (step S107). Thereafter, the control section 56 may measure the difference $\Delta T_{4-5}$ between the timings of the pulse waveforms of the OPA pumping light 4 and the OPA signal light 5 by means of the first and second monitor sections 51 and 52 (step S108).

Next, the control section 56 may determine whether or not the difference $\Delta T_{4-5}$ is equal to or lower than a predetermined allowable value $\Delta T_{4-5}$max as indicated by the following expression (step S109):

$$|\Delta T_{4-5}| \le \Delta T_{4-5}\text{max}$$

In a case in which the difference $\Delta T_{4-5}$ is not equal to or lower than the predetermined allowable value $\Delta T_{4-5}$max (step S109: N), the control by the control section 56 may return to the process in the step S106. In a case in which the difference $\Delta T_{4-5}$ is equal to or lower than the predetermined allowable value $\Delta T_{4-5}$max (step S109: Y), the control section 56 may measure a difference $\Delta T_{5-3}$ between timings of pulse waveforms of two pulsed laser light beams corresponding to the OPA signal light 5 and the wavelength conversion target light 3 by means of the second and third monitor sections 52 and 53 (step S110).

Next, the control section 56 may adjust the timings of the triggers by the processes in the steps S111 to S114 so as to allow both the amplified light 5A of the OPA signal light 5 and the wavelength conversion target light 3 to enter the Raman cell 2 substantially simultaneously. For this adjustment, the control section 56 may first calculate the following delay data correction value for the third laser device 30 (step S111).

$$T3ds = T3ds + \Delta T_{5-3}$$

Next, the control section 56 may transmit the delay data T4ds of the trigger of the first laser device 10, the delay data T5ds of the trigger of the second laser device 20, and the delay data T3ds of the trigger of the third laser device 30 to the trigger delay circuit 55 (step S112). Thereafter, the control section 56 may measure the difference $\Delta T_{5-3}$ between the timings of the pulse waveforms of the OPA signal light 5 and the wavelength conversion target light 3 by means of the second and third monitor sections 52 and 53 (step S113).

Next, the control section 56 may determine whether or not the difference $\Delta T_{5-3}$ is equal to or lower than the predetermined allowable value $\Delta T_{5-3}$max as indicated by the following expression (step S114):

$$|\Delta T_{5-3}| \le \Delta T_{5-3}\text{max}$$

In a case in which the difference $\Delta T_{5-3}$ is not equal to or lower than the predetermined allowable value $\Delta T_{5-3}$max (step S114: N), the control by the control section 56 may return to the process in the step S111. In a case in which the difference $\Delta T_{5-3}$ is equal to or lower than the predetermined allowable value $\Delta T_{5-3}$max (step S114: Y), the control section 56 may measure wavelengths (the wavelength λ4, the wavelength λ5, and the wavelength λ6) of output light beams of the OPA 50 by means of the fourth monitor section 54 (step S115).

Next, the control section 56 may measure the target wavelength λ5t of the OPA signal light 5 for causing of the high-coherence Raman phenomenon by the foregoing expression (3) (step S116). Thereafter, the control section 56 may set the setting wavelength λ5s of the second laser device 20 to the target wavelength λ5t (step S117).

Next, the control section 56 may adjust the wavelength of the second laser device 20 by the processes in the steps S118 to S121 so as to cause the high-coherence Raman phenomenon. For this adjustment, the control section 56 may first transmit the setting wavelength data λ4s and λ5s to the first and second laser devices 10 and 20, respectively (step S118). Thereafter, the control section 56 may measure the wavelengths (the wavelength λ4, the wavelength λ5, and the wavelength λ6) of the output light beams of the OPA 50 by means of the fourth monitor section 54 (step S119).

Next, the control section 56 may measure a difference Δλ5 (=λ5−λ5t) between the measured wavelength λ5 and the target wavelength λ5t of the OPA signal light 5 (step S120). Thereafter, the control section 56 may determine whether or not the difference Δλ5=δλ5 is equal to or lower than a predetermined allowable value δλ5max as indicated by the following expression (step S121):

$$|δλ5| ≤ δλ5max$$

In a case in which the difference Δλ5=δλ5 is not equal to or lower than the predetermined allowable value δλ5max (step S121: N), the control by the control section 56 may return to the process in the step S118. In a case in which the difference Δλ5=δλ5 is equal to or lower than the predetermined allowable value δλ5max (step S121: Y), the control section 56 may determine whether or not to stop the generation of the VUV light 9 (step S122). In a case in which the generation of the VUV light 9 is stopped (step S122: Y), the flow of the control may be ended. In a case in which the generation of the VUV light 9 is not stopped (step S122: N), the control by the control section 56 may return to the process in the step S105.

5.3 Workings

According to the second embodiment, the first monitor section 51 and the second monitor section 52 may measure the time pulse waveforms and the timings of the two pulsed laser light beams corresponding to the OPA pumping light 4 and the OPA signal light 5. The OPA pumping light 4 and the OPA signal light 5 may enter the OPA 50. Since input timings of the triggers to the first and second laser devices 10 and 20 are controlled, based on the measurement results, the OPA 50 may generate the amplified light 5A of the OPA signal light 5 and the idler light 6 efficiently and stably.

Moreover, according to the second embodiment, the fourth monitor section 54 may measure the wavelengths of the OPA pumping light 4, the amplified light 5A of the OPA signal light 5, and the idler light 6. The oscillation wavelength of the second laser device 20 may be controlled, based on the measurement results, so as to allow a difference in light energy between the OPA pumping light 4 and the amplified light 5A of the OPA signal light 5 to cause one of Raman resonance and near resonance at high accuracy. As a result, the VUV light 9 may be generated efficiently and stably.

Further, the third monitor section 53 may measure the timing and the time pulse waveform of the pulse when the wavelength conversion target light 3 enters the Raman cell 2. Since the timing of the trigger to the third laser device 30 is controlled, based on the measurement results, the VUV light 9 to be outputted from the Raman cell 2 may be generated efficiently and stably.

5.4 Modification Examples

In the foregoing description, the wavelength difference δλ$_{4-5}$ between the wavelength λ4 and the wavelength λ5 and the target value Δδ$_{4-5}$t of the wavelength difference may be measured, and the control section 56 may transmit the control signal to the second laser device 20 and control the oscillation wavelength so as to bring the target value Δλ$_{4-5}$ close to 0. The second embodiment is not limited to this example, and the oscillation wavelength of the first laser device 10 may be controlled. Alternatively, both the oscillation wavelengths of the first and second laser devices 10 and 20 may be controlled.

Further, the pulse width ΔT4 of the OPA pumping light 4 may be preferably equal to or lower than the pulse width ΔT5 of the OPA signal light 5.

The timings of the pulsed laser light beams corresponding to the OPA pumping light 4, the OPA signal light 5, and the wavelength conversion target light 3 each may be a time of a peak of a time pulse waveform or an average value of two times of a half value of the peak. A full width at half maximum of the pulse width of the OPA signal light 5 may be from 20 ns to 40 ns. A full width at half maximum of the pulse width of the OPA pumping light 4 may be from 10 ns+10 ns to 30 ns+10 ns. A full width at half maximum of the pulse width of the wavelength conversion target light 3 may be from 10 ns to 30 ns.

6. [Third Embodiment](Variations of pumping light generator with OPA)

In a third embodiment, description is given of variations of the pumping light generator 1 that is applicable to the VUV light generators according to the foregoing first and second embodiments.

6.1 First Configuration Example 6.1.1 Configuration

Figure 10:
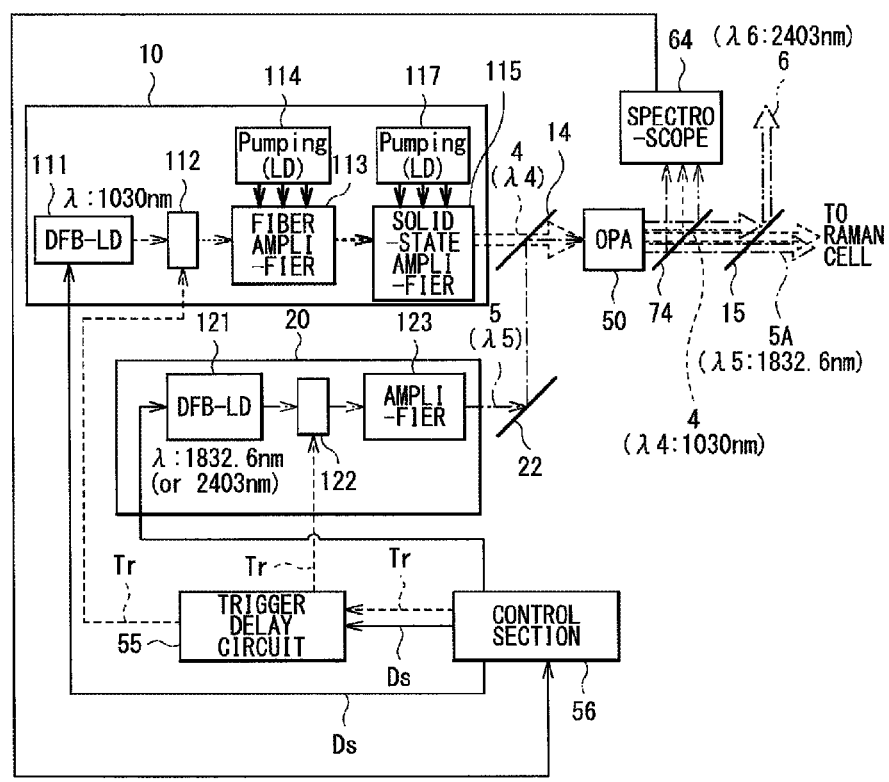
FIG. 10 schematically illustrates a first configuration example of the pumping light generator.

FIG. 10 schematically illustrates a first configuration example of the pumping light generator 1. It is to be noted that substantially the same components as those in the VUV light generator illustrated in FIG. 2 or FIG. 7 are denoted with the same reference numerals, and redundant description thereof is omitted.

The first laser device 10 may include a distributed-feedback laser diode (DFB-LD) 111, a light shutter 112, a fiber amplifier 113, and a solid-state amplifier 115 as illustrated in FIG. 10. The fiber amplifier 113 may perform pumping by means of a laser diode (LD) 114. The solid amplifier 115 may perform pumping by means of an LD 117. The light shutter 112, the fiber amplifier 113, and the solid-state amplifier 115 may be disposed in this order in a light path of output laser light of the DFB-LD 111.

The DFB-LD 111 may correspond to a laser light source that outputs seed light as a seed of the OPA pumping light 4. The DFB-LD 111 may be a laser that oscillates in the CW single longitudinal mode. The DFB-LD 111 may include a device that controls a temperature of a semiconductor at high accuracy by means of a Peltier device, for example. The oscillation wavelength λ of the DFB-LD 111 may be 1030 nm. The light shutter 112 may be a light shutter including a combination of an EO Pockels cell and a polarizer. The fiber amplifier 113 may be doped with a metal. The fiber amplifier 113 may include the LD 114 for pumping. The solid-state amplifier 115 may include an yttrium aluminum garnet (YAG) crystal rod doped with a metal and the LD 117 for pumping.

The second laser device 20 may include a DFB-LD 121, a light shutter 122, and an amplifier 123. The light shutter 122 and the amplifier 123 may be disposed in this order in a light path of output laser light of the DFB-LD 121. The DFB-LD 121 may be a laser that oscillates in the CW single longitudinal mode. The DFB-LD 121 may include a device that controls a temperature of a semiconductor at high accuracy by means of a Peltier device, for example. The oscillation wavelength λ of the DFB-LD 121 may be 1832.6 nm or 2403 nm. The light shutter 122 may be a light shutter including a combination of an EO Pockels cell and a polarizer.

Although not illustrated in FIG. 10, the first monitor section 51 and the second monitor section 52 may be respectively disposed at positions similar to the first monitor section 51 and the second monitor section 52 in FIG. 7.

6.1.2 Operation

With reference to FIG. 10, the control section 56 may set a temperature of temperature control of the DFB-LD 111 so as to allow the target oscillation wavelength λ of the DFB-LD 111 to be equal to 1030 nm, thereby allowing a predetermined current to flow into a semiconductor via an unillustrated direct-current power supply. Moreover, the control section 56 may set the temperature of temperature control of the DFB-LD 121 so as to allow the target oscillation wavelength λ of the DFB-LD 121 to be equal to 1832.6 nm or 2403 nm, thereby allowing the predetermined current to flow into the semiconductor via the unillustrated direct-current power supply. As a result, the DFB-LD 111 may output CW laser light of a wavelength λ=1030 nm. Moreover, the DFB-LD 121 may output CW laser light of a wavelength λ=1832.6 nm or 2403 nm.

The control section 56 may perform control so as to allow a current to flow into the LD 114 of the fiber amplifier 113 and the LD 117 of the solid-state amplifier 115, thereby perform pumping. Further, the control section 56 may transmit a trigger to the trigger delay circuit 55. As a result, an open-close signal may be outputted from the trigger delay circuit 55 to each of the light shutter 112 and the light shutter 122. Accordingly, pulsed laser light beams may be outputted as outputs of the light shutter 112 and the light shutter 122.

The pulsed laser light beam outputted from the light shutter 112 may be amplified by the fiber amplifier 113 and the solid-state amplifier 115 to enter the OPA 50 as the OPA pumping light 4. Moreover, the pulsed laser light beam outputted from the light shutter 122 may be amplified by the amplifier 123 to enter the OPA 50 as the OPA signal light 5. As a result, the OPA 50 may output pulsed laser light beams corresponding to the OPA pumping light 4, the amplified light 5A of the OPA signal light 5, and the idler light 6 simultaneously.

The above-described three pulsed laser light beams reflected by the beam splitter 74 may enter the spectroscope 64, and the spectroscope 64 may measure the wavelengths of the three pulsed laser light beams. The idler light 6 of a wavelength of 2403 nm out of the pulsed laser light beams outputted from the OPA 50 may be reflected by the dichroic mirror 15 at high reflectivity. The amplified light 5A of the OPA signal light 5 of a wavelength of 1832 nm and the OPA pumping light 4 of a wavelength of 1030 nm may enter the Raman cell 2 along the same axis after polarizations of the amplified light 5A of the OPA signal light 5 and the OPA pumping light 4 are aligned.

The control section 56 may vary one or both of oscillation wavelengths of DFB-LD 111 and DFB-LD 121 to a wavelength that may cause the high-coherence Raman phenomenon, based on measurement results of the wavelength λ4 of the OPA pumping light 4 and the wavelength λS of the amplified light 5A of the OPA signal light 5.

6.1.3 Workings

According to the first configuration example, the first laser device 10 may output a basic wave as the OPA pumping light 4. Since a double wave is not necessary in the first laser device 10, the first laser device 10 may output the OPA pumping light 4 at high efficiency.

6.1.4 Modification Examples

The fiber amplifier 113 of the first laser device 10 may be an amplifier including an optical fiber doped with Yb. Further, the solid-state amplifier 115 may include a crystal such as neodymium-doped yttrium aluminum garnet (Nd:YAG), neodymium-doped yttrium lithium fluoride (Nd:YLF), and neodymium-doped yttrium vanadate (Nd:YVO4).

A frequency difference between a wavelength of 1030 nm and a wavelength of 1832 nm may be a wavelength that may cause near resonance with vibrational transition of a para-hydrogen gas.

Moreover, the OPA 50 may be disposed inside an optical resonator. Two mirrors of the optical resonator each may reflect a part, for example, about 30% to about 70% of the OPA signal light 5 of the wavelength λ5. This may make it possible to improve conversion efficiency into the OPA signal light 5.

6.2 Second Configuration Example

Figure 11:
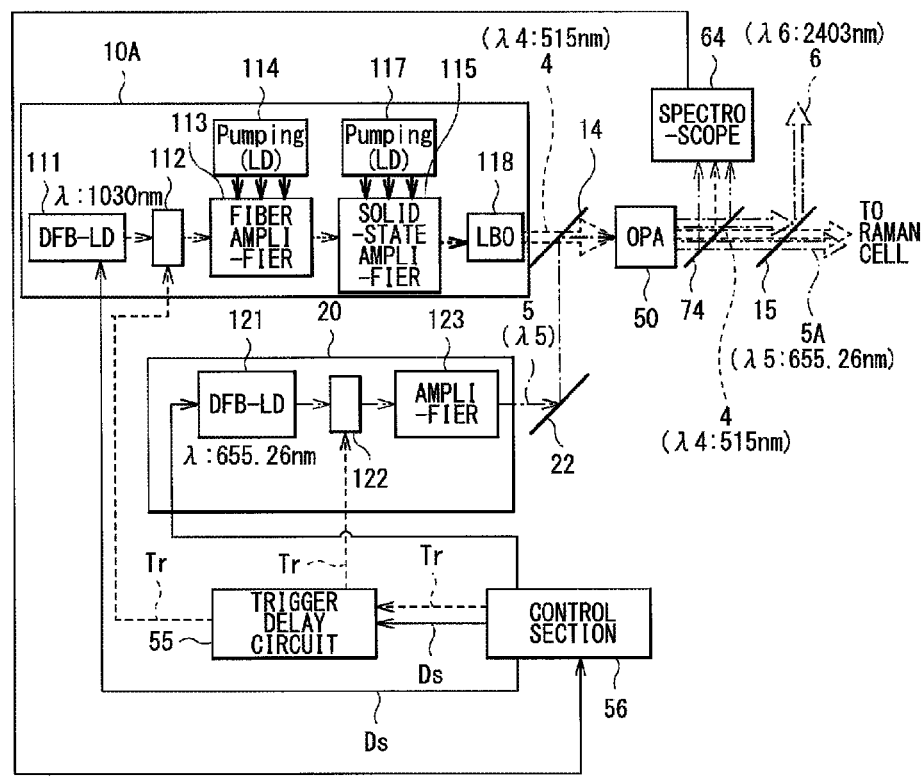
FIG. 11 schematically illustrates a second configuration example of the pumping light generator.

FIG. 11 schematically illustrates a second configuration example of the pumping light generator 1. It is to be noted that substantially the same components as those in the pumping light generator 1 illustrated in FIG. 10 are denoted with the same reference numerals, and redundant description thereof is omitted.

The pumping light generator 1 illustrated in FIG. 11 may include a first laser device 10A in place of the first laser device 10 illustrated in FIG. 10. The first laser device 10A may include a nonlinear LBO crystal 118 serving as a harmonic generating element. The nonlinear LBO crystal 118 may be disposed on light output side of the solid-state amplifier 115. The first laser device 10A may generate second harmonic light (a wavelength of 515 nm) of a wavelength of 1030 nm by means of the nonlinear LBO crystal 118. The oscillation wavelength λ of the DFB-LD 121 of the second laser device 20 may be 655.26 nm. A pulsed laser light beam of a wavelength of 515 nm and a pulsed laser light beam of a wavelength of 655.26 nm may enter the Raman cell 2. The pulsed laser light beam of the wavelength of 515 nm may correspond to the OPA pumping light 4, and the pulsed laser light beam of the wavelength of 655.26 nm may correspond to the amplified light 5A of the OPA signal light 5. According to the second configuration example, the wavelength of 655.26 nm is a wavelength obtained by a typical DFB-LD, which may make it possible to achieve systemization easily.

6.3 Third Configuration Example

6.3.1 Configuration

Figure 12:
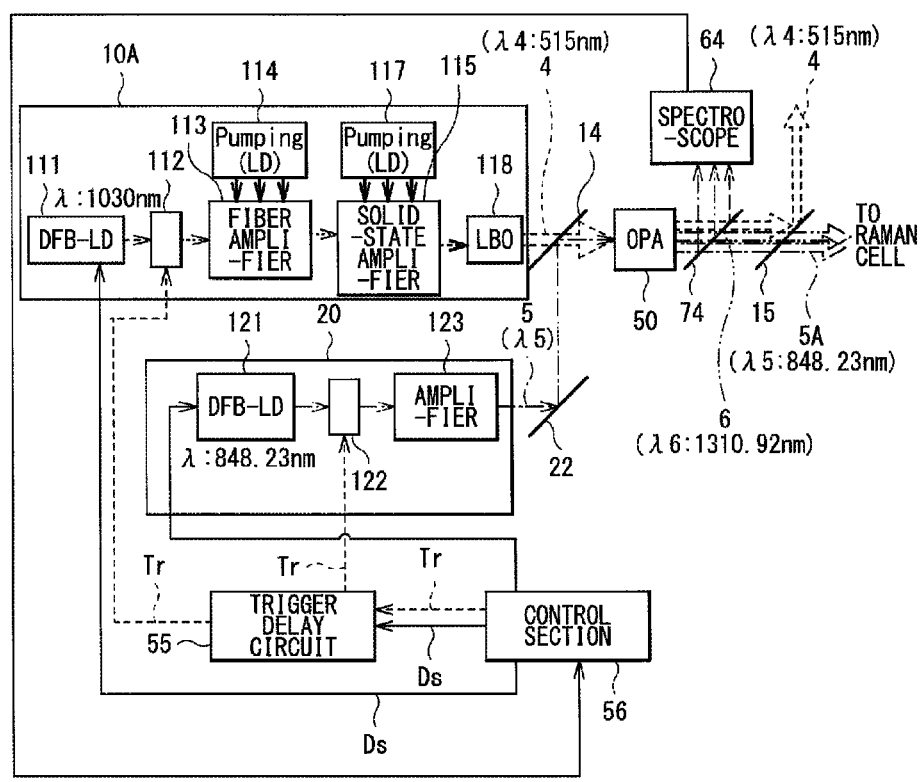
FIG. 12 schematically illustrates a third configuration example of the pumping light generator.

FIG. 12 schematically illustrates a third configuration example of the pumping light generator 1. It is to be noted that substantially the same components as those in the pumping light generator 1 illustrated in FIG. 11 are denoted with the same reference numerals, and redundant description thereof is omitted.

The oscillation wavelength λ of the DFB-LD 121 of the second laser device 20 may be 848.23 nm. Two pulsed laser light beams of the wavelengths X5 and X6 may enter the Raman cell 2 as illustrated in FIG. 12. The two pulsed laser light beams of the wavelengths λ5 and λ6 may correspond to the amplified light 5A (the wavelength λ5=848.23 nm) of the OPA signal light 5 that is to be outputted from the OPA 50 and the idler light 6 (the wavelength λ6=1310.92 nm) that is to be outputted from the OPA 50.

6.3.2 Operation and Workings

In the third configuration example, the amplified light 5A of the OPA signal light 5 and the idler light 6 may be substantially coincident in polarization direction and pulse waveform with each other. Accordingly, the amplified light 5A of the OPA signal light 5 and the idler light 6 may enter the Raman cell 2 from the OPA 50 without changing their state. This may cause the high-coherence Raman phenomenon. The third configuration example may be used in a wavelength band in which crystal absorption of the OPA 50 is at minimum. This may make it possible to achieve higher power and longer lifetime.

6.4 Fourth Configuration Example 6.4.1 Configuration

Figure 13:
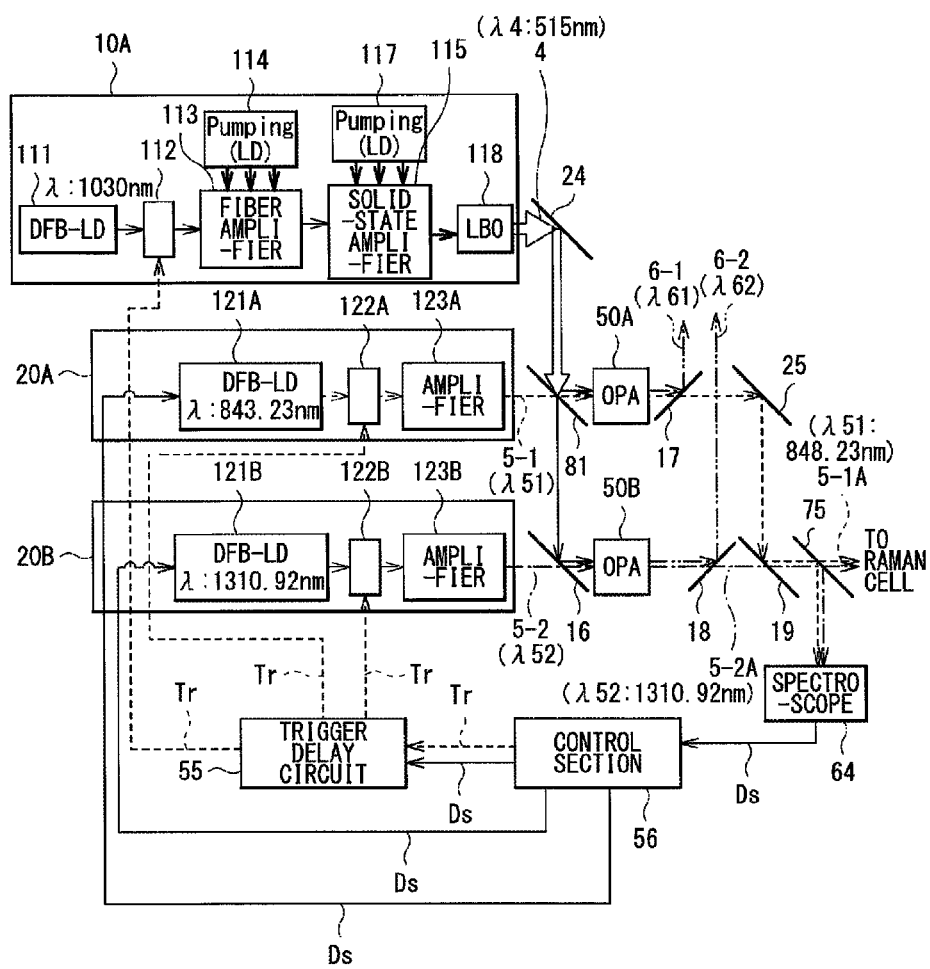
FIG. 13 schematically illustrates a fourth configuration example of the pumping light generator.

FIG. 13 schematically illustrates a fourth configuration example of the pumping light generator 1. It is to be noted that substantially the same components as those in the pumping light generator 1 illustrated in FIG. 11 are denoted with the same reference numerals, and redundant description thereof is omitted.

The pumping light generator 1 illustrated in FIG. 13 may include a 2-1th laser device 20A and a 2-2th laser device 20B in place of the second laser device 20 illustrated in FIG. 11. Further, the pumping light generator 1 may include a first OPA 50A and a second OPA 50B as the OPA 50. The first OPA 50A may output first Raman-cell pumping light to the Raman cell 2. The second OPA 50B may output second Raman-cell pumping light to the Raman cell 2. The pumping light generator 1 illustrated in FIG. 13 may further include a high-reflective mirror 24, a high-reflective mirror 25, a half mirror 81, dichroic mirrors 16, 17, 18, and 19, and a beam splitter 75. The half mirror 81 may serve as an optical splitter.

The first laser device 10A may correspond to a first OPA laser device that outputs the OPA pumping light 4 for the first OPA 50A and the second OPA 50B. The 2-1th laser device 20A may correspond to a second OPA laser device that outputs first OPA signal light 5-1 to the first OPA 50A. The 2-2th laser device 20B may correspond to a third OPA laser device that outputs second OPA signal light 5-2 to the second OPA 50B.

The DFB-LD 111 in the first laser device 10A may be a laser that oscillates laser light of a wavelength of 1030 nm in the CW mode. The DFB-LD 111 may not necessarily be a laser that oscillates in the single longitudinal mode.

The 2-1th laser device 20A may include a distributed-feedback laser diode (DFB-LD) 121A, a light shutter 122A, and an amplifier 123A. The light shutter 122A and the amplifier 123A may be disposed in this order in a light path of output laser light of the DFB-LD 121A. The DFB-LD 121A may be a laser that oscillates in the CW single longitudinal mode. The DFB-LD 121A may include a device that controls a temperature of a semiconductor at high accuracy by means of a Peltier device, for example. The oscillation wavelength $\lambda$ of the DFB-LD 121A may be 848.23 nm. The light shutter 122A may be a light shutter including a combination of an EO Pockels cell and a polarizer.

The 2-2th laser device 20B may include a distributed-feedback laser diode (DFB-LD) 121B, a light shutter 122B, and an amplifier 123B. The light shutter 122B and the amplifier 123B may be disposed in this order in a light path of output laser light of the DFB-LD 121B. The DFB-LD 121B may be a laser that oscillates in the CW single longitudinal mode. The DFB-LD 121B may include a device that controls a temperature of a semiconductor at high accuracy by means of a Peltier device, for example. The oscillation wavelength $\lambda$ of the DFB-LD 121B may be 1310.92 nm. The light shutter 122B may be a light shutter including a combination of an EO Pockels cell and a polarizer.

The high-reflective mirror 24, the half mirror 81, and the dichroic mirror 16 may be so disposed as to allow the OPA pumping light 4 outputted from the first laser device 10A to enter each of the first OPA 50A and the second OPA 50B.

The half mirror 81 may correspond to an optical splitter that splits the OPA pumping light 4 outputted from the first laser device 10A into two to be branched to the first OPA 50A and the second OPA 50B. The half mirror 81 may be coated with a film that reflects 50% of light of the wavelength $\lambda 4=511$ nm corresponding to the OPA pumping light 4 and allows light of a wavelength $\lambda 51=848.23$ nm corresponding to the first OPA signal light 5-1 to pass therethrough at high transmittance.

The dichroic mirror 17 may be coated with a film that allows light of the wavelength $\lambda 51=848.23$ nm corresponding to amplified light 5-1A of the first OPA signal light 5-1 to pass therethrough at high transmittance and reflects light of a wavelength $\lambda 61$ corresponding to first idler light 6-1 at high reflectivity. The dichroic mirror 18 may be coated with a film that allows light of a wavelength $\lambda 52=1310.92$ nm corresponding to amplified light 5-2A of the second OPA signal light 5-2 to pass therethrough at high transmittance and reflects light of a wavelength $\lambda 62$ corresponding to second idler light 6-2 at high reflectivity.

The dichroic mirror 19 may be coated with a film that reflects the light of the wavelength $\lambda 51$ corresponding to the amplified light 5-1A of the first OPA signal light 5-1 at high reflectivity and allows the light of the wavelength $\lambda 52$ corresponding to the amplified light 5-2A of the second OPA signal light 5-2 to pass therethrough at high transmittance. The beam splitter 75 may be coated with a film that reflects a part of the light of the wavelength $\lambda 51$ corresponding to the amplified light 5-1A of the first OPA signal light 5-1 and a part of the light of the wavelength $\lambda 52$ corresponding to the amplified light 5-2A of the second OPA signal light 5-2.

6.4.2 Operation

As illustrated in FIG. 13, the pulsed laser light beam outputted from the first laser device 10A may be split by the half mirror 81 to be branched to the first OPA 50A and the second OPA 50B.

In the 2-1th laser device 20A, a CW laser light beam of the wavelength $\lambda 51=848.23$ nm may be outputted from the DFB-LD 121A to enter the light shutter 122A. At this occasion, the light shutter 122A may output a pulsed laser light beam with a predetermined pulse, and the pulsed laser light beam may be amplified by the amplifier 123A, following which the thus-amplified pulsed laser light beam may enter the first OPA 50A as the first OPA signal light 5-1.

In the 2-2th laser device 20B, a CW laser light beam of the wavelength $\lambda 52=1310.92$ nm may be outputted from the DFB-LD 121B to enter the light shutter 122B. At this occasion, the light shutter 122B may output a pulsed laser light beam with a predetermined pulse, and the pulsed laser light beam may be amplified by the amplifier 123B, following which the thus-amplified pulsed laser light beam may enter the second OPA 50B as the second OPA signal light 5-2.

The first OPA 50A may output the amplified light 5-1A of the first OPA signal light 5-1 of the wavelength $\lambda 51=848.23$ nm and the first idler light 6-1. The first idler light 6-1 may be reflected by the dichroic mirror 17 at high reflectivity. The amplified light 5-1A of the first OPA signal light 5-1 may be reflected by the high-reflective mirror 25 at high reflectivity to enter the dichroic mirror 19.

The second OPA 50B may output the amplified light 5-2A of the second OPA signal light 5-2 of the wavelength $\lambda 52=1310.92$ nm and the second idler light 6-2. The second idler light 6-2 may be reflected by the dichroic mirror 18 at high reflectivity. The amplified light 5-2A of the second OPA signal light 5-2 may enter the dichroic mirror 19.

The amplified light 5-1A of the first OPA signal light 5-1 and the amplified light 5-2A of the second OPA signal light 5-2 may be aligned in substantially the same light path by the dichroic mirror 19 to enter the Raman cell 2 through the beam splitter 75.

A part of the amplified light 5-1A of the first OPA signal light 5-1 and a part of the amplified light 5-2A of the second OPA signal light 5-2 may be reflected by the beam splitter 75 to enter the spectroscope 64. The control section 56 may control an oscillation wavelength of one or both of the DFB-LD121A and DFB-LD121B, based on the wavelength λ51 of the amplified light 5-1A and the wavelength λ52 of the amplified light 5-2A that have been measured by the spectroscope 64, so as to cause the high-coherence Raman phenomenon in the Raman cell 2.

6.4.3 Workings

When the fiber amplifier 113 has higher power, a spectral line width of seed light may be increased. When a spectral line width of laser light is increased, the laser light may not be used as pumping light of the Raman cell 2 in some cases.

Accordingly, in the fourth configuration example, the pulsed laser light beam outputted from the first laser device 10A may be split into two to be branched to the first and second OPAs 50A and 50B, and the OPA signal light 5-1 of the first OPA 50A and the OPA signal light 5-2 of the second OPA 50B each may be amplified to be used as pumping light of the Raman cell 2. This may make it possible to stably control the spectral line widths and the wavelengths of amplified light 5-1A of the first OPA signal light 5-1 and the amplified light 5-2A of the second OPA signal light 5-2. This may cause generation of optimum pumping light for the Raman cell 2.

6.4.4 Modification Examples

Laser light beams outputted from the 2-1th laser device 20A and the 2-2th laser device 20B each may cause output of CW signal light that outputs light intensity allowing for optical parametric amplification by the first and second OPAs 50A and 50B. In such a case, at least the light shutter 122A and the light shutter 122B may be excluded. In a case with a distributed-feedback laser diode that outputs light intensity allowing for optical parametric amplification by the first and second OPAs 50A and 50B without the amplifiers 123A and 123B, the amplifiers 123A and 123B may be excluded. In this case, it may not be necessary to control the timing of the pulsed laser light beam outputted from the first laser device 10A, and the pulse waveform and the spectral line width of signal light may be stabilized.

6.5 Fifth Configuration Example 6.5.1 Configuration

Figure 14:
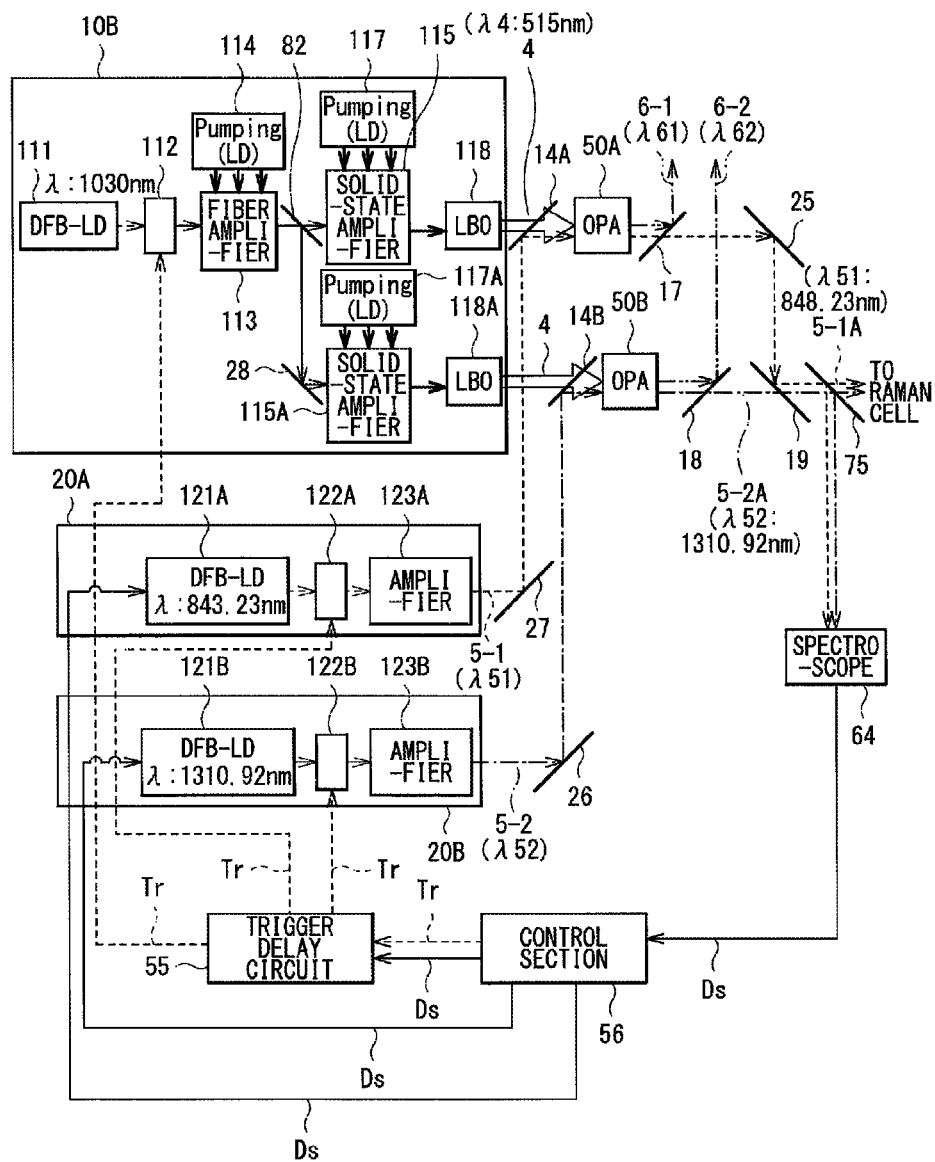
FIG. 14 schematically illustrates a fifth configuration example of the pumping light generator.

FIG. 14 schematically illustrates a fifth configuration example of the pumping light generator 1. It is to be noted that substantially the same components as those in the pumping light generator 1 illustrated in FIG. 13 are denoted with the same reference numerals, and redundant description thereof is omitted.

The pumping light generator 1 illustrated in FIG. 14 may include a first laser device 10B in place of the first laser device 10A in FIG. 13. The pumping light generator 1 illustrated in FIG. 14 may further include a high-reflective mirror 26, a high-reflective mirror 27, and dichroic mirrors 14A and 14B.

The first laser device 10B may correspond to a first OPA laser device that outputs two pumping light beams each corresponding to the OPA pumping light 4. One of the pumping light beams may be outputted to the first OPA 50A and the other of the pumping light beams may be outputted to the second OPA 50B.

The first laser device 10B may further include another solid-state amplifier 115A that performs pumping by means of a laser diode (LD) 117A, in addition to the solid-state amplifier 115. Moreover, the first laser diode 10B may further include another LBO 118A in addition to the LBO 118. The first laser device 10B may further include a half mirror 82 and a high-reflective mirror 28.

In the first laser device 10B, a laser light beam outputted from the fiber amplifier 113 may be split by the half mirror 82 to be branched to the solid-state amplifiers 115 and 115A, and the solid-state amplifiers 115 and 115A each may amplify the laser light beam. The LBOs 118 and 118A each may generate second harmonic light of the amplified laser light beam. Each second harmonic light may enter a corresponding one of the first OPA 50A and the second OPA 50B as the OPA pumping light 4.

The dichroic mirror 14A may be disposed in a light path between the LBO 118 and the first OPA 50A. The dichroic mirror 14A may be coated with a film that allows the OPA pumping light 4 to pass therethrough at high transmittance and reflects the first OPA signal light 5-1 to the first OPA 50A at high reflectivity. The dichroic mirror 14B may be disposed in a light path between the LBO 118A and the second OPA 50B. The dichroic mirror 14B may be coated with a film that allows the OPA pumping light 4 to pass therethrough at high transmittance and reflects the second OPA signal light 5-2 to the second OPA 50B at high reflectivity.

The high-reflective mirror 27 may reflect the first OPA signal light 5-1 from the 2-1th laser device 20A to the dichroic mirror 14A at high reflectivity. The high-reflective mirror 27 may reflect the second OPA signal light 5-2 from the 2-2th laser device 20B to the dichroic mirror 14B at high reflectivity.

6.5.2 Operation and Workings

In the fifth configuration example, as compared with a case in which the OPA pumping light 4 is amplified only by one solid-state amplifier 115 and the amplified OPA pumping light 4 is branched as with the fourth configuration example in FIG. 13, two pumping light beams each corresponding to the OPA pumping light 4 may be amplified in parallel by the solid-state amplifiers 115 and 115A. Thus, energy of each of the pumping light beams each corresponding to the OPA pumping light 4 that enters corresponding one of the first OPA 50A and the second OPA 50B may be increased by a factor of about 2.

[7. Fourth Embodiment](VUV light Generator in which polarization directions are Optimized)

In the foregoing first to third embodiments, it may be necessary to align polarization directions of two pumping light beams to the Raman cell 2 to be the same as each other. The polarization direction of the wavelength conversion target light 3 may not necessarily be aligned to be the same as the polarization directions of the two pumping light beams to the Raman cell 2. In the embodiment, description is given of a VUV light generator in which the polarization directions of the first Raman-cell pumping light and the second Raman-cell pumping light are optimized with reference to FIGS. 15 and 16. It is to be noted that substantially the same components as those in the VUV light generator illustrated in FIG. 2 are denoted with the same reference numerals, and redundant description thereof is omitted.

7.1 First Configuration Example

Figure 15:
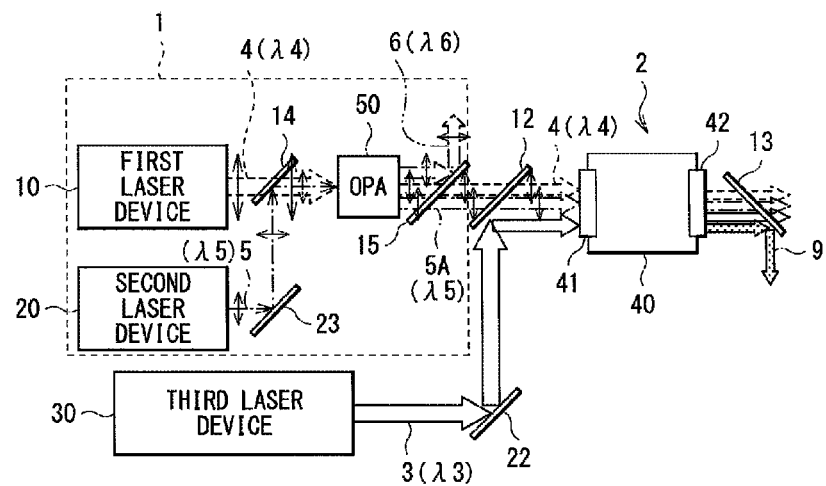
FIG. 15 schematically illustrates a first configuration example of a VUV light generator in which polarization directions of pumping light beams to a Raman cell are optimized.

FIG. 15 schematically illustrates a first configuration example of the VUV light generator in which the polarization directions of the first Raman-cell pumping light and the second Raman-cell pumping light are optimized. In FIG. 15, a solid line with arrows at both ends indicates a polarization direction including a paper plane.

For example, in a case with quasi-phase matching using periodically poled lithium niobate (PPLN) as a crystal of the OPA 50, the OPA pumping light 4 and the OPA signal light 5 that are to enter the OPA 50 each may be substantially linearly polarized light as illustrated in FIG. 15. Further, the polarization of the OPA pumping light 4 and the polarization direction of the OPA signal light 5 may be aligned to be substantially the same as each other. As a result, the polarization directions of the OPA pumping light 4 outputted from the OPA 50, the amplified light 5A of the OPA signal light 5, and the idler light 6 may be substantially the same as one another. In this case, at least two light beams out of these three light beams may enter the Raman cell 2 as the first Raman-cell pumping light and the second Raman-cell pumping light without changing their state.

7.2 Second Configuration Example

Figure 16:
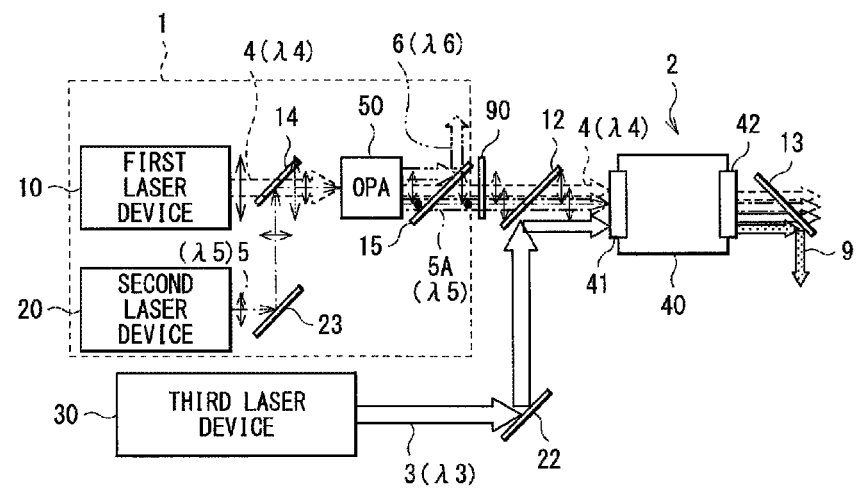
FIG. 16 schematically illustrates a second configuration example of the VUV light generator in which the polarization directions of the pumping light beams to the Raman cell are optimized.

FIG. 16 schematically illustrates a second configuration example of the VUV light generator in which the polarization directions of the first Raman-cell pumping light and the second Raman-cell pumping light are optimized. In FIG. 16, a solid line with arrows at both sides indicates a polarization direction including a paper plane, and a black dot indicates a polarization direction perpendicular to the paper plane.

For example, in a case in which BBO is used as the crystal of the OPA 50, the polarization directions of two light beams that are to enter the Raman cell 2 may be different by 90 degrees from each other. In this case, a $\lambda/2$ plate 90 may be disposed as a retarder in a light path between the OPA 50 and the Raman cell 2 as illustrated in FIG. 16. The $\lambda/2$ plate 90 may delay only one wavelength, for example, the wavelength $\lambda 5$ by a $\lambda/2$ phase. As a result, the polarization directions of two light beams that are to enter the Raman cell 2 may be aligned to be substantially the same as each other.

[8. Fifth Embodiment](Optimization of Raman-cell Pumping Light)

8.1 Optimization of Wavelength of Raman-Cell Pumping Light

In the foregoing first to fourth embodiments, the wavelength of the first Raman-cell pumping light that is to enter the Raman cell 2 and the wavelength of the second Raman-cell pumping light that is to enter the Raman cell 2 may preferably satisfy the following:

$$(\Delta Ef/h)-1 \text{ (GHz)} \leq h \cdot c/\lambda a - h \cdot c/\lambda b \leq (\Delta Ef/h)+1 \text{ (GHz)}$$

where h denotes Planck's constant, c denotes light speed, $\Delta Ef$ denotes a band gap of Raman resonance, $\lambda a$ denotes the wavelength of the first Raman-cell pumping light, and $\lambda b$ denotes the wavelength of the second Raman-cell pumping light.

More preferably, the following may be satisfied:

$$(\Delta Ef/h)-5 \text{ (GHz)} \leq h \cdot c/\lambda a - h \cdot c/\lambda b \leq (\Delta Ef/h)+5 \text{ (GHz)}$$

8.2 Optimization of Spectral Line Width of Raman-Cell Pumping Light

In the foregoing first to fourth embodiments, wavelengths of the first Raman-cell pumping light and the second Raman-cell pumping light that are to enter the Raman cell 2 may preferably satisfy the following:

$$\Delta \lambda a \leq (10 \text{ GHz}/c) \lambda a^2$$

$$\Delta \lambda b \leq (10 \text{ GHz}/c) \lambda b^2$$

where $\Delta \lambda a$ denotes a spectral line width of a wavelength $\lambda a$ of the first Raman-cell pumping light, and $\Delta \lambda b$ denotes a spectral line width of a wavelength $\lambda b$ of the second Raman-cell pumping light.

More preferably, the following may be satisfied:

$$\Delta \lambda a \leq (2 \text{ GHz}/c) \lambda a^2$$

$$\Delta \lambda b \leq (2 \text{ GHz}/c) \lambda b^2$$

[9. Hardware Environment Of Control Section]

A person skilled in the art will appreciate that a general-purpose computer or a programmable controller may be combined with a program module or a software application to execute any subject matter disclosed herein. The program module, in general, may include one or more of a routine, a program, a component, a data structure, and so forth that each causes any process described in any example embodiment of the disclosure to be executed.

Figure 17:
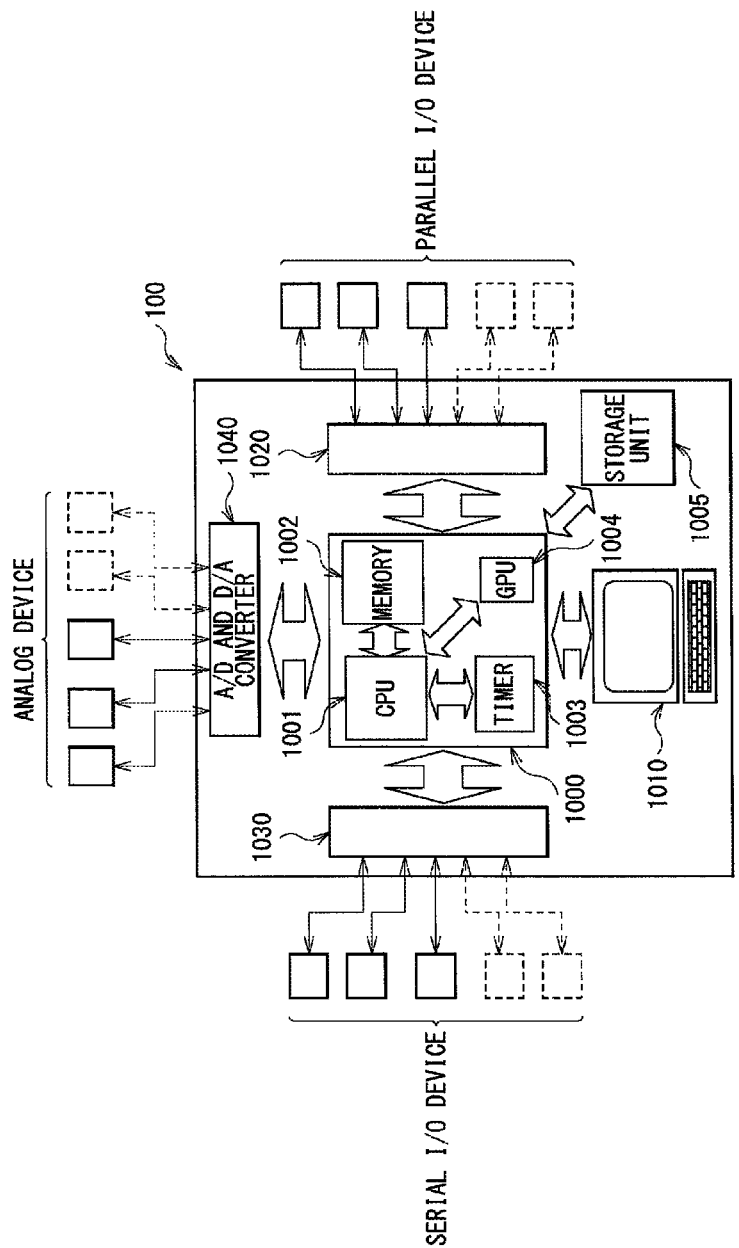
FIG. 17 illustrates an example of a hardware environment of a controller.

FIG. 17 is a block diagram illustrating an exemplary hardware environment in which various aspects of any subject matter disclosed therein may be executed. An exemplary hardware environment 100 in FIG. 17 may include a processing unit 1000, a storage unit 1005, a user interface 1010, a parallel input/output (I/O) controller 1020, a serial I/O controller 1030, and an analog-to-digital (A/D) and digital-to-analog (D/A) converter 1040. Note that the configuration of the hardware environment is not limited thereto.

The processing unit 1000 may include a central processing unit (CPU) 1001, a memory 1002, a timer 1003, and a graphics processing unit (GPU) 1004. The memory 1002 may include a random access memory (RAM) and a read only memory (ROM). The CPU 1001 may be any commercially-available processor. A dual microprocessor or any other multi-processor architecture may be used as the CPU 1001.

The components illustrated in FIG. 17 may be coupled to one another to execute any process described in any example embodiment of the disclosure.

Upon operation, the processing unit 1000 may load programs stored in the storage unit 1005 to execute the loaded programs. The processing unit 1000 may read data from the storage unit 1005 together with the programs, and may write data in the storage unit 1005. The CPU 1001 may execute the programs loaded from the storage unit 1005. The memory 1002 may be a work area in which programs to be executed by the CPU 1001 and data to be used for operation of the CPU 1001 are held temporarily. The timer 1003 may measure time intervals to output a result of the measurement to the CPU 1001 in accordance with the execution of the programs. The GPU 1004 may process image data in accordance with the programs loaded from the storage unit 1005, and may output the processed image data to the CPU 1001.

The parallel I/O controller 1020 may be coupled to parallel I/O devices operable to perform communication with the processing unit 1000, and may control the communication performed between the processing unit 1000 and the parallel I/O devices. Non-limiting examples of the parallel I/O devices may include the trigger delay circuit 55, the first laser devices 10, 10A, and 10B, the second laser device 20, the third laser device 30, the 2-1th laser device 20A, the 2-2th laser device 20B, and spectroscope 64. The serial I/O controller 1030 may be coupled to a plurality of serial I/O devices operable to perform communication with the processing unit 1000, and may control the communication performed between the processing unit 1000 and the serial I/O devices. The A/D and D/A converter 1040 may be coupled to analog devices such as various kinds of sensors through respective analog ports. Non-limiting examples of the sensors may include the first light sensor 61, the second light sensor 62, and the third light sensor 63. The A/D and D/A converter 1040 may control communication performed between the processing unit 1000 and the analog devices, and may perform analog-to-digital conversion and digital-to-analog conversion of contents of the communication.

The user interface 1010 may provide an operator with a display showing a progress of the execution of the programs executed by the processing unit 1000, such that the operator is able to instruct the processing unit 1000 to stop execution of the programs or to execute an interruption routine.

The exemplary hardware environment 100 may be applied to one or more of configurations of the control section 56 and other controllers according to any example embodiment of the disclosure. A person skilled in the art will appreciate that such controllers may be executed in a distributed computing environment, namely, in an environment where tasks may be performed by processing units linked through any communication network. In any example embodiment of the disclosure, the control section 56 and other controllers may be coupled to one another through a communication network such as Ethernet (Registered Trademark) or the Internet. In the distributed computing environment, the program module may be stored in each of local and remote memory storage devices.

[10. Et Cetera]

The foregoing description is intended to be merely illustrative rather than limiting. It should therefore be appreciated that variations may be made in example embodiments of the disclosure by persons skilled in the art without departing from the scope as defined by the appended claims.

The terms used throughout the specification and the appended claims are to be construed as "open-ended" terms. For example, the term "include" and its grammatical variants are intended to be non-limiting, such that recitation of items in a list is not to the exclusion of other like items that can be substituted or added to the listed items. The term "have" and its grammatical variants are intended to be non-limiting, such that recitation of items in a list is not to the exclusion of other like items that can be substituted or added to the listed items. Also, the singular forms "a", "an", and "the" used in the specification and the appended claims include plural references unless expressly and unequivocally limited to one referent.

What is claimed is:

1. A laser system, comprising:
    a Raman cell;
    a pumping light generator including one optical parametric amplifier (OPA), a first OPA laser device, and a second OPA laser device, and configured to output first Raman-cell pumping light and second Raman-cell pumping light to the Raman cell, the first OPA laser device being configured to output OPA pumping light to the OPA, the second OPA laser device being configured to output OPA signal light to the OPA;
    a Raman cell laser unit configured to output probing light as a target of wavelength conversion to the Raman cell;
    a pumping light monitor section configured to measure a state of the OPA pumping light;
    a signal light monitor section configured to measure a state of the OPA signal light; and
    a timing controller configured to control the first OPA laser device and the second OPA laser device to allow both the OPA pumping light and the OPA signal light to be inputted to the OPA substantially simultaneously, based on measurement results by the pumping light monitor section and the signal light monitor section.

2. The laser system according to claim 1, wherein the OPA is configured to receive the OPA pumping light and the OPA signal light, and to output two light beams out of three light beams to the Raman cell, the three light beams corresponding to the OPA pumping light, amplified light of the OPA signal light, and idler light, whereas the two light beams corresponding to the first Raman-cell pumping light and the second Raman-cell pumping light.

3. The laser system according to claim 2, further comprising:
    a probing light monitor section configured to measure a state of the probing light, wherein
    the timing controller is configured to control the second OPA laser device and the Raman cell laser unit to allow both the amplified light of the OPA signal light and the probing light to be inputted to the Raman cell substantially simultaneously, based on measurement results by the signal light monitor section and the probing light monitor section.

4. The laser system according to claim 2, further comprising:
    an OPA monitor section disposed in a light path between the OPA and the Raman cell, and configured to measure states of the OPA pumping light, the amplified light of the OPA signal light, and the idler light; and
    a wavelength controller configured to control one or both of the first OPA laser device and the second OPA laser device to allow wavelengths of the two light beams to be a desired wavelength, based on a measurement result by the OPA monitor section.

5. The laser system according to claim 1, wherein
    the Raman cell contains a gas molecule, and
    wavelengths of the first Raman cell pumping light and the second Raman cell pumping light each cause one of resonance and near resonance of the gas molecule.

6. The laser system according to claim 1, wherein the Raman cell is configured to output anti-Stokes light of a vacuum ultraviolet light wavelength.

7. The laser system according to claim 1, wherein the first OPA laser device includes a laser light source, a light shutter, and an amplifier, the laser light source being configured to output seed light as a seed of the OPA pumping light, and the light shutter and the amplifier being disposed in order in a light path of the seed light.

8. The laser system according to claim 7, wherein the first OPA laser device further includes a harmonic generating element disposed on a light output side of the amplifier.

9. The laser system according to claim 1, wherein a polarization direction of the first Raman-cell pumping light and a polarization direction of the second Raman-cell pumping light are substantially the same as each other.

10. The laser system according to claim 1, further comprising a retarder disposed in a light path between the Raman cell and the pumping light generator, and configured to align a polarization direction of the first Raman-cell pumping light and a polarization direction of the second Raman-cell pumping light to be substantially the same as each other.

11. The laser system according to claim 1, wherein wavelengths of the first Raman-cell pumping light and the second Raman-cell pumping light satisfy the following:

$$(\Delta Ef/h)-1 \text{ (GHz)} \le h \cdot c/\lambda a - h \cdot c/\lambda b \le (\Delta Ef/h)+1 \text{ (GHz)}$$

where h denotes Planck's constant, c denotes light speed, $\Delta Ef$ denotes a band gap of Raman resonance, $\lambda a$ denotes the wavelength of the first Raman-cell pumping light, and $\lambda b$ denotes the wavelength of the second Raman-cell pumping light.

12. The laser system according to claim 1, wherein wavelengths of the first Raman-cell pumping light and the second Raman-cell pumping light satisfy the following:

$$\Delta\lambda a \leq (10 \text{ GHz}/c)\lambda a^2$$

$$\Delta\lambda b \leq (10 \text{ GHz}/c)\lambda b^2$$

where $\Delta\lambda a$ denotes a spectral line width of a wavelength $\lambda a$ of the first Raman-cell pumping light, and $\Delta\lambda b$ denotes a spectral line width of a wavelength $\lambda b$ of the second Raman-cell pumping light.

13. A laser system, comprising:
a Raman cell;
a pumping light generator including a plurality of optical parametric amplifiers (OPAs), and configured to output first Raman-cell pumping light and second Raman-cell pumping light to the Raman cell; and
a Raman cell laser unit configured to output probing light as a target of wavelength conversion to the Raman cell,
wherein the OPAs include:
a first OPA configured to output the first Raman-cell pumping light to the Raman cell;
a second OPA configured to output the second Raman-cell pumping light to the Raman cell, and
wherein the pumping light generator further includes:
a first OPA laser device configured to output an OPA pumping light beam;
an optical splitter configured to split the OPA pumping light beam outputted from the first OPA laser device into two to be branched to the first OPA and the second OPA;
a second OPA laser device configured to output first OPA signal light to the first OPA; and
a third OPA laser device configured to output second OPA signal light to the second OPA.

14. A laser system, comprising:
a Raman cell;
a pumping light generator including a plurality of optical parametric amplifiers (OPAs), and configured to output first Raman-cell pumping light and second Raman-cell pumping light to the Raman cell; and
a Raman cell laser unit configured to output probing light as a target of wavelength conversion to the Raman cell,
wherein the OPAs include:
a first OPA configured to output the first Raman-cell pumping light to the Raman cell;
a second OPA configured to output the second Raman-cell pumping light to the Raman cell, and
wherein the pumping light generator further includes:
a first OPA laser device configured to output two OPA pumping light beams, one of the two OPA pumping light beams being outputted to the first OPA and the other of the two OPA pumping light beams being outputted to the second OPA;
a second OPA laser device configured to output first OPA signal light to the first OPA; and
a third OPA laser device configured to output second OPA signal light to the second OPA.

15. A laser system comprising:
a Raman cell;
a pumping light generator including one optical parametric amplifier (OPA), a first OPA laser device, and a second OPA laser device, and configured to output first Raman-cell pumping light and second Raman-cell pumping light to the Raman cell, the first OPA laser device being configured to output OPA pumping light to the OPA, the second OPA laser device being configured to output OPA signal light to the OPA; and
a Raman cell laser unit configured to output probing light as a target of wavelength conversion to the Raman cell,
the first OPA laser device including a laser light source, a light shutter, and an amplifier, the laser light source being configured to output seed light as a seed of the OPA pumping light, the light shutter and the amplifier being disposed in order in a light path of the seed light.

* * * * *